US012059620B2

(12) United States Patent
Liu et al.

(10) Patent No.: US 12,059,620 B2
(45) Date of Patent: Aug. 13, 2024

(54) METHOD AND APPARATUS FOR SELECTING VIRTUAL OBJECT INTERACTION MODE, DEVICE, MEDIUM, AND PRODUCT

(71) Applicant: TENCENT TECHNOLOGY (SHENZHEN) COMPANY LIMITED, Shenzhen (CN)

(72) Inventors: Xiaohao Liu, Shenzhen (CN); Peicheng Liu, Shenzhen (CN); Shuai Jiang, Shenzhen (CN); Minxuan Pan, Shenzhen (CN); Qinghua Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 164 days.

(21) Appl. No.: 17/741,425

(22) Filed: May 10, 2022

(65) Prior Publication Data
US 2022/0266141 A1 Aug. 25, 2022

Related U.S. Application Data

(63) Continuation of application No. PCT/CN2021/125294, filed on Oct. 21, 2021.

(30) Foreign Application Priority Data

Dec. 30, 2020 (CN) .......................... 202011612418.X

(51) Int. Cl.
*A63F 13/56* (2014.01)
*A63F 13/537* (2014.01)
(52) U.S. Cl.
CPC ............ *A63F 13/56* (2014.09); *A63F 13/537* (2014.09)

(58) Field of Classification Search
CPC ........ A63F 13/56; A63F 13/57; A63F 13/573; A63F 13/577; A63F 13/58; A63F 13/53;
(Continued)

(56) References Cited

U.S. PATENT DOCUMENTS 6,987,512 B2 * 1/2006 Robertson ............... G06T 15/20
345/581
7,774,155 B2 * 8/2010 Sato ....................... A63F 13/428
345/169
(Continued)

FOREIGN PATENT DOCUMENTS

CN 107291317 A 10/2017
CN 110755841 A 2/2020
(Continued)

OTHER PUBLICATIONS

The Japan Patent Office (JPO) Notification of Reasons for Refusal for Application No. 2022-568641 and Translation Dec. 4, 2023 10 Pages.

(Continued)

*Primary Examiner* — David L Lewis
*Assistant Examiner* — Matthew D Hoel
(74) *Attorney, Agent, or Firm* — ANOVA LAW GROUP, PLLC

(57) ABSTRACT

A method for selecting a virtual object interaction mode includes: displaying a target interaction control configured to control a target virtual object to select an interactive object in a first interaction mode in a virtual battle and interact with the interactive object; displaying a candidate mode option in response to an operation for displaying interaction mode for the target interaction control; switching the first interaction mode to a second interaction mode in response to a selection operation of interaction mode for the target mode option; and displaying an interactive effect
(Continued)

between the target virtual object and a target interactive object in response to an operation for displaying interactive effect for the target interaction control.

20 Claims, 11 Drawing Sheets

(58) Field of Classification Search
CPC . A63F 13/537; A63F 13/5372; A63F 13/5375
See application file for complete search history.

(56) References Cited

U.S. PATENT DOCUMENTS

| | | | | |
|---|---|---|---|---|
| 10,466,775 | B2* | 11/2019 | Inomata | G06T 11/60 |
| 10,765,945 | B2* | 9/2020 | Kitazono | A63F 13/5258 |
| 11,094,106 | B2* | 8/2021 | Tamaoki | A63F 13/525 |
| 11,369,875 | B2* | 6/2022 | Nakada | A63F 13/48 |
| 11,446,578 | B2* | 9/2022 | Tanaka | A63F 13/525 |
| 11,497,996 | B2* | 11/2022 | Imai | A63F 13/55 |
| 11,508,125 | B1* | 11/2022 | Latta | G06T 19/003 |
| 11,779,839 | B2* | 10/2023 | Imai | A63F 13/428 463/37 |
| 2008/0132335 | A1* | 6/2008 | Yamaguchi | A63F 13/573 463/37 |
| 2012/0062444 | A1* | 3/2012 | Cok | G02B 27/0172 345/8 |
| 2013/0095924 | A1* | 4/2013 | Geisner | A63F 13/21 463/32 |
| 2013/0328927 | A1* | 12/2013 | Mount | G06T 19/20 345/633 |
| 2013/0336629 | A1* | 12/2013 | Mulholland | H04N 9/87 386/230 |
| 2014/0078175 | A1* | 3/2014 | Forutanpour | G06F 3/012 345/633 |
| 2014/0106879 | A1 | 4/2014 | Tabata et al. | |
| 2014/0364212 | A1* | 12/2014 | Osman | A63F 13/537 463/31 |
| 2015/0258432 | A1* | 9/2015 | Stafford | A63F 13/426 463/32 |
| 2016/0042566 | A1* | 2/2016 | Mao | A63F 13/213 463/31 |
| 2016/0266386 | A1* | 9/2016 | Scott | G06F 3/017 |
| 2016/0361649 | A1* | 12/2016 | Hayashi | A63F 13/5255 |
| 2017/0038838 | A1* | 2/2017 | Kato | G06F 3/0481 |
| 2017/0266556 | A1* | 9/2017 | Motohashi | A63F 13/35 |
| 2020/0316472 | A1 | 10/2020 | Hu | |
| 2021/0236934 | A1* | 8/2021 | Yagihashi | A63F 13/533 |
| 2022/0016528 | A1* | 1/2022 | Ichikawa | A63F 13/35 |
| 2022/0080313 | A1 | 3/2022 | Wu et al. | |
| 2022/0266141 | A1* | 8/2022 | Liu | A63F 13/5372 |
| 2022/0266142 | A1* | 8/2022 | Liu | A63F 13/5375 |
| 2022/0266143 | A1* | 8/2022 | Feng | A63F 13/426 |
| 2022/0355202 | A1* | 11/2022 | Li | A63F 13/2145 |
| 2023/0120147 | A1 | 4/2023 | Xu | |
| 2023/0347244 | A1* | 11/2023 | Chen | A63F 13/58 |

FOREIGN PATENT DOCUMENTS

| | | |
|---|---|---|
| CN | 111228812 A | 6/2020 |
| CN | 111481930 A | 8/2020 |
| CN | 111589131 A | 8/2020 |
| CN | 112044071 A | 12/2020 |
| CN | 112704876 A | 4/2021 |
| JP | 2014076213 A | 5/2014 |
| KR | 1020200006853 A | 1/2020 |

OTHER PUBLICATIONS

The World Intellectual Property Organization (WIPO) International Search Report for PCT/CN2021/125294 Jan. 19, 2022 7 Pages (including translation).
Game Hu, "The interface operation chapter of the King's Glory beginner's guide," zhihu.com, Oct. 29, 2020 (Oct. 29, 2020), pp. 2-4, Retrieved from the Internet: URL: https://zhuanlan.zhihu.com/p/269803590, [retrieved on May 4, 2022]. 19 pages (including translation).
China National Intellectual Property Administration (CNIPA) Office Action 1 for 202011612418.X Jul. 5, 2022 12 pages (including translation).
Anonymous, "How to set the priority attack target of King of Glory," Baidu Experience, Nov. 18, 2020, Retrieved from the Internet: URL: https://jingyan.baidu.com/article/19020a0ada2c0f139d2842cf.html [retrieved on Jul. 6, 2022]. 11 pages (including translation).
Yiwei Li, "Overview of Menu Patent Technology," Technology Innovation and Application, 2019 Issue 10, Dec. 31, 2019, pp. 25-26. 2 pages.
Korean Intellectual Property Office (Kipo) Office Action 1 for 2022-7016403 Mar. 25, 2024 9 Pages (including translation).
Intellectual Property Office of SINGAPORE Search Report and Written Opinion for Application No. 11202204987U May 15, 2024 10 pages.
King of Glory Beginner's Guide to Interface Operations. Oct. 29, 2020 Part 1, Section (3), Fig. 6 Citation is not enclosed due to copyright restrictions. A copy may be obtained from the URL at https://baijiahao.baidu.com/s?id=1681861091400639220&wfr=spider&for=pc.
How to set priority attack target in King of Glory. Nov. 18, 2020, Whole document particularly Steps 3-4 Citation is not enclosed due to copyright restrictions. A copy may be obtained from the URL at https://jingyan.baidu.com/article/19020a0ada2c0f139d2842cf.html. 7 pages (including translation).

* cited by examiner

METHOD AND APPARATUS FOR SELECTING VIRTUAL OBJECT INTERACTION MODE, DEVICE, MEDIUM, AND PRODUCT

CROSS-REFERENCE TO RELATED APPLICATIONS

This application is a continuation application of PCT Patent Application No. PCT/CN2021/125294, filed on Oct. 21, 2021, which claims priority to Chinese Patent Application No. 202011612418, filed on Dec. 30, 2020, and entitled "METHOD AND APPARATUS FOR SELECTING VIRTUAL OBJECT INTERACTION MODE, DEVICE, AND STORAGE MEDIUM", the entire contents of all of which are incorporated herein by reference.

FIELD OF THE TECHNOLOGY

The present disclosure relates to the field of virtual environments, and in particular, to a method and apparatus for selecting a virtual object interaction mode, a device, a medium, and a product.

BACKGROUND OF THE DISCLOSURE

Terminals, such as a smartphone and a tablet computer, are provided with various application programs including, for example, a virtual reality application program, a three-dimensional map program, a military simulation program, a third-person shooting (TPS) game, a first-person shooting (FPS) game, and a multiplayer online battle arena (MOBA) game, based on a virtual environment. In the foregoing application programs, a user-controlled master virtual object can perform a virtual battle and interact with other virtual objects in the virtual battle.

In the related art, an interaction between a master virtual object and other virtual objects is performed in a pre-selected interaction form. Based on the interaction form, the master virtual object determines an interaction priority of interacting with the other virtual objects, and preferentially interacts with a virtual object with a highest interaction priority.

However, the master virtual object may require a change on the interaction form during a virtual battle. In this case, a user is not able to adjust the interaction form in time, resulting in low efficiency of human-computer interaction in the process of determining and selecting an interaction mode for the virtual object.

SUMMARY

Embodiments of the present disclosure provide a method and apparatus for selecting a virtual object interaction mode, a device, a medium, and a product, which can improve the efficiency of human-computer interaction in a process of determining and selecting an interaction mode for virtual objects. The technical solutions are as follows:

According to one aspect, a method for selecting a virtual object interaction mode is provided, including: displaying a target interaction control, the target interaction control being configured to control a target virtual object to select an interactive object in a first interaction mode in a virtual battle and interact with the interactive object; displaying a candidate mode option in response to an operation for displaying interaction mode for the target interaction control, the candidate mode option including a target mode option, and the target mode option corresponding to a second interaction mode; switching the first interaction mode to the second interaction mode in response to a selection operation of interaction mode for the target mode option; and displaying an interactive effect between the target virtual object and a target interactive object in response to an operation for displaying interactive effect for the target interaction control, the target interactive object being an interactive object determined according to the second interaction mode.

According to another aspect, a computer device is provided, including a processor and a memory, the memory storing at least one instruction, at least one program, a code set, or an instruction set, the at least one instruction, the at least one program, the code set, or the instruction set being loaded and executed by the processor to implement a method for selecting a virtual object interaction mode. The method includes displaying a target interaction control, the target interaction control being configured to control a target virtual object to select an interactive object in a first interaction mode in a virtual battle and interact with the interactive object; displaying a candidate mode option in response to an operation for displaying interaction mode for the target interaction control, the candidate mode option including a target mode option, and the target mode option corresponding to a second interaction mode; switching the first interaction mode to the second interaction mode in response to a selection operation of interaction mode for the target mode option; and displaying an interactive effect between the target virtual object and a target interactive object in response to an operation for displaying interactive effect for the target interaction control, the target interactive object being an interactive object determined according to the second interaction mode.

According to another aspect, a non-transitory computer-readable storage medium is provided, storing at least one instruction, at least one program, a code set, or an instruction set, the at least one instruction, the at least one program, the code set, or the instruction set being loaded and executed by a processor to implement a method for selecting a virtual object interaction mode. The method includes displaying a target interaction control, the target interaction control being configured to control a target virtual object to select an interactive object in a first interaction mode in a virtual battle and interact with the interactive object; displaying a candidate mode option in response to an operation for displaying interaction mode for the target interaction control, the candidate mode option including a target mode option, and the target mode option corresponding to a second interaction mode; switching the first interaction mode to the second interaction mode in response to a selection operation of interaction mode for the target mode option; and displaying an interactive effect between the target virtual object and a target interactive object in response to an operation for displaying interactive effect for the target interaction control, the target interactive object being an interactive object determined according to the second interaction mode.

The technical solutions provided in the embodiments of the present disclosure produce at least the following beneficial effects.

During a virtual battle, when a target interaction form of a virtual object is to select an interactive object according to a first interaction mode to implement interaction with the interactive object, a candidate mode option is displayed after an operation for displaying interaction mode for a target interaction control is received, a finally selected interaction mode is determined according to the selection operation of interaction mode, and subsequently, a corresponding target interactive object is determined according to a switched interaction mode when an operation for displaying interactive effect is received by the target interaction control. In the virtual battle, by means of an operation on a target interaction control received on a virtual battle interface, a user can flexibly switch an interaction mode corresponding to a target interaction form according to a situation in the virtual battle, which improves the efficiency of human-computer interaction.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from these accompanying drawings without creative efforts.

DESCRIPTION OF EMBODIMENTS

Figure 1:
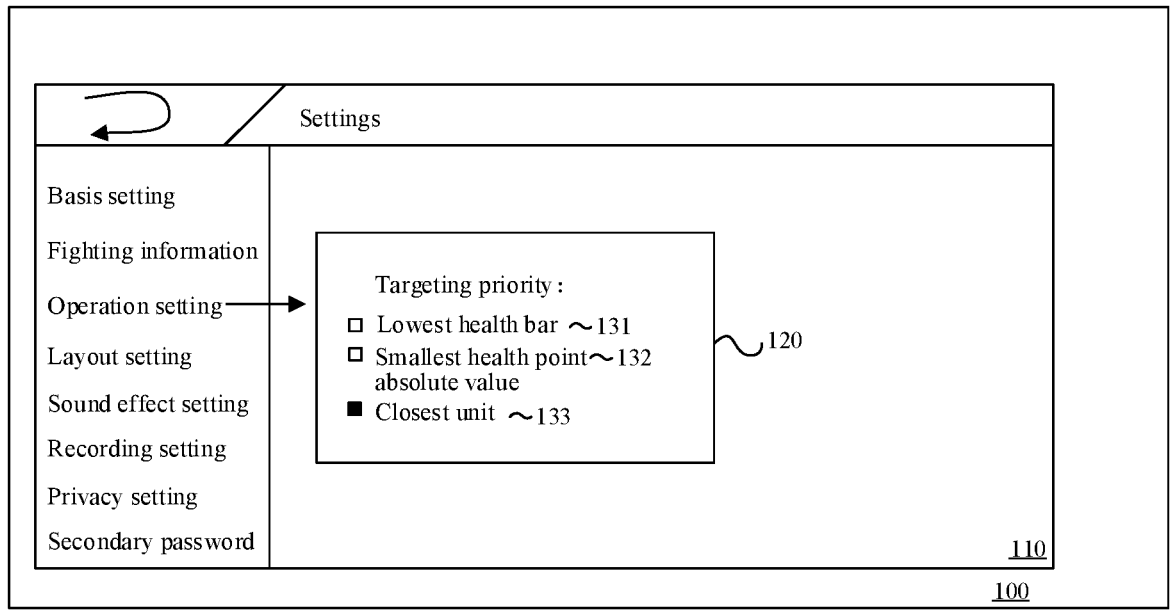
FIG. 1 is a schematic diagram of a method for selecting a virtual object interaction mode.

To make the objectives, technical solutions, and advantages of the present disclosure clearer, the following further describes implementations of the present disclosure in detail with reference to the accompanying drawings.

As used herein, unless otherwise specified, the term "virtual environment" refers to a virtual environment displayed (or provided) when an application program runs on a terminal.

As used herein, unless otherwise specified, the term "virtual object" refers to a movable object in the virtual environment. The movable object may be a virtual character, a virtual animal, or a cartoon character. The embodiments of the present disclosure are described using the virtual object as a master virtual object, as an example for description, and the master virtual object may refer to one or more master virtual objects in the virtual environment.

As disclosed, the virtual object is a virtual object that performs a virtual battle. The virtual battle is a battle generated in an application program and includes virtual objects. In one example, a virtual battle has a battle goal. The virtual battle includes at least one user-controlled virtual object.

In an example, a virtual battle includes at least one user-controlled virtual object, and the virtual object is a master virtual object of a user. By controlling the master virtual object, the user can fight against opposing virtual objects in a virtual environment to perform the virtual battle. In one embodiment, the virtual battle includes a player versus environment (PVE) battle and a player versus player (PVP) battle.

A multiplayer online battle arena (MOBA) game is an arena game in which different virtual teams of at least two opposing camps occupy respective map regions in a virtual environment, and compete against each other using specific victory conditions as goals. The victory conditions include, but are not limited to at least one of occupying forts or destroying forts of the opposing camps, killing virtual objects in the opposing camps, ensure own survivals in a specified scenario and time, seizing a specific resource, and outscoring the opponent within a specified time. The battle arena game may take place in rounds. The same map or different maps may be used in different rounds of the battle arena game. Each virtual team includes one or more virtual objects. A duration of a round of the MOBA game is from a time point at which the game starts to a time point at which the victory condition is met.

In the MOBA game, a user's master virtual object interacts with other virtual objects. In one embodiment, according to a camp relationship between the other virtual objects and the master virtual object, different types of interaction occur between the master virtual object and the other virtual objects. In an example, an interaction between the master virtual object and the other virtual objects is an attack, when the master virtual object and the other virtual objects are in two opposing camps, that is, there is an opposing relationship between the master virtual object and the other virtual objects. In another example, an interaction between the master virtual object and the other virtual objects is to provide a gain, when the master virtual object and the other virtual objects are in the same camp, that is, there is a cooperative relationship between the master virtual object and the other virtual objects. The type of relationships between the master virtual object and the other virtual objects is not limited in the present disclosure.

In a virtual battle, there are at least two virtual objects. When there are at least two virtual objects, and an interaction occurs between the virtual objects, a virtual object usually determines an interactive object according to an interaction mode pre-stored in a client. For different situations in a virtual battle, a user selects an interaction mode matching a current situation for the virtual object, so that the virtual object interacts with other virtual objects in the corresponding interaction mode in the virtual battle. FIG. 1 is a schematic diagram of a method for selecting a virtual object interaction mode in the related art. Referring to FIG. 1, a setting interface 110 is displayed on a virtual battle interface 100, the setting interface 110 includes an operation setting region 120, and the operation setting region 120 includes a targeting priority mode 130. The targeting priority mode includes a total of three optional virtual object interaction modes, that is, an interaction mode identifier 131 for preferentially attacking an opposing virtual object with a lowest health bar, an interaction mode identifier 132 for preferentially attacking an opposing virtual object with smallest health point absolute value, and an interaction mode identifier 133 for preferentially attacking an opposing virtual object closest to the virtual object. As shown in FIG. 1, the interaction mode identifier 133 is selected. In this case, in a virtual battle, the virtual object preferentially attacks an opposing virtual object closest to the virtual object according to a relationship between the virtual object and other opposing virtual objects and following an interaction identifier corresponding to the interaction mode identifier 133.

Figure 2:
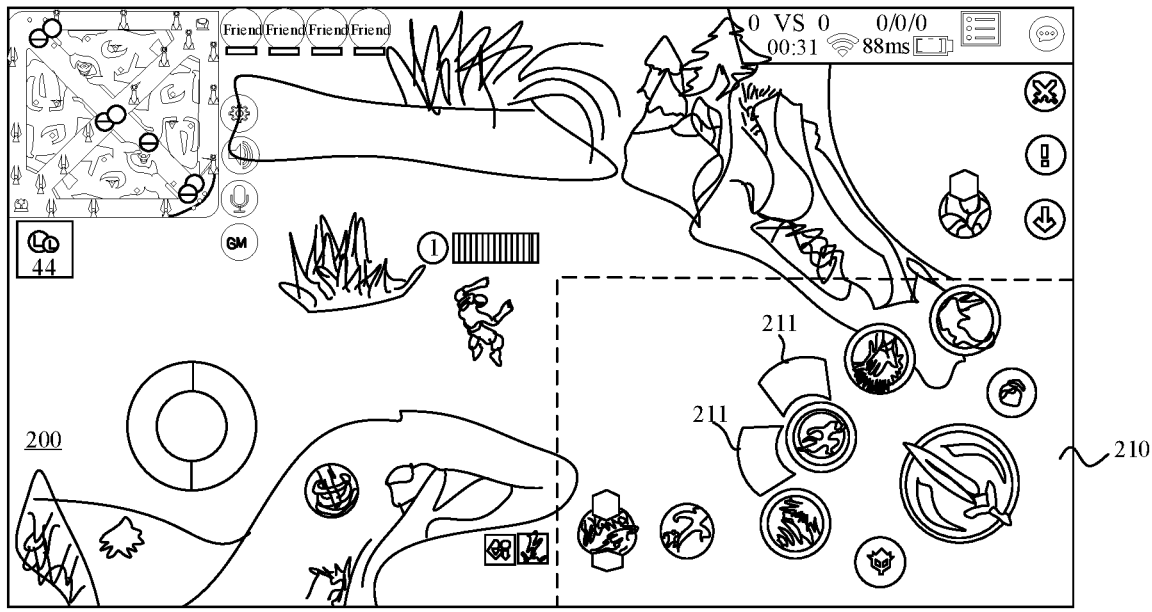
FIG. 2 is a schematic diagram of a method for selecting a virtual object interaction mode according to an exemplary embodiment of the present disclosure.

In the method for selecting a virtual object interaction mode provided in the present disclosure, as shown in FIG. 2, an interaction mode display region 210 is directly displayed on a virtual battle interface 200, and the interaction mode display region 210 includes at least two mode options 211. By selecting the mode options 211, the interaction mode followed by the virtual object in the virtual battle can be determined.

Figure 3:
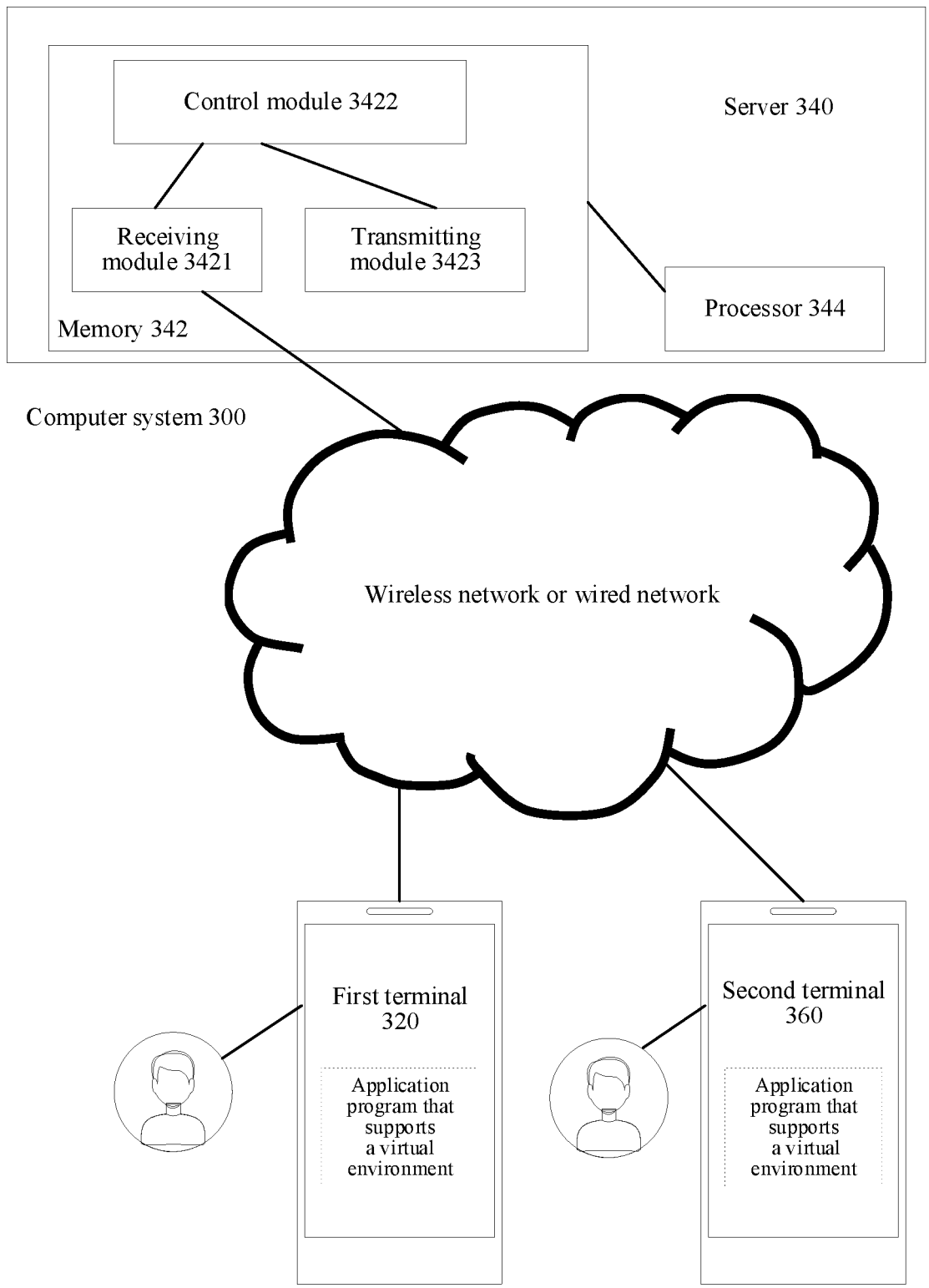
FIG. 3 is a structural block diagram of a computer system according to an exemplary embodiment of the present disclosure.

FIG. 3 is a structural block diagram of a computer system according to an exemplary embodiment of the present disclosure. The computer system 300 includes a first terminal 320, a server 340, and a second terminal 360.

An application program supporting a virtual environment is installed and run on the first terminal 320. The application program may be any one of a virtual reality application program, a three-dimensional map program, a military simulation program, an FPS game, a MOBA game, a multiplayer shooting survival game, and a battle escape shooting game. The first terminal 320 is a terminal used by a first user, and the first user uses the first terminal 320 to control a first master virtual object in the virtual environment to perform movement. The movement includes, but is not limited to, at least one of body posture adjustment, walking, running, jumping, casting an ability, picking-up, attacking, and dodging attacks from other virtual objects. For example, the first master virtual object is a first virtual person, such as a simulated person role or a cartoon person role. For example, the first master virtual object casts a regional ability in the virtual environment, and the virtual environment interface moves from a location at which the master virtual object is located to a target region selected by a regional ability indicator. The regional ability indicator is configured to select a cast region when the master virtual object casts an ability.

The first terminal 320 is connected to the server 340 by using a wireless network or a wired network.

The server 340 includes at least one of one server, a plurality of servers, a cloud computing platform, and a virtualization center. For example, the server 340 includes a processor 344 and a memory 342. The memory 342 further includes a receiving module 3421, a control module 3422, and a transmitting module 3423. The receiving module 3421 is configured to receive a request transmitted by a client, such as a team forming request; the control module 3422 is configured to control rendering of the virtual environment interface; and the transmitting module 3423 is configured to transmit a message notification to the client, such as a notification of successful team formation. The server 340 is configured to provide a backend service for an application program supporting a three-dimensional virtual environment. In one embodiment, the server 340 is responsible for primary computing work, and the first terminal 320 and the second terminal 360 are responsible for secondary computing work. Alternatively, the server 340 is responsible for secondary computing work, and the first terminal 320 and the second terminal 360 are responsible for primary computing work. Alternatively, the server 340, the first terminal 320, and the second terminal 360 perform collaborative computing by using a distributed computing architecture among each other.

The second terminal 360 is connected to the server 340 by using a wireless network or a wired network.

An application program supporting a virtual environment is installed and run on the second terminal 360. The second terminal 360 is a terminal used by a second user, and the second user uses the second terminal 360 to control a second master virtual object located in the virtual environment to perform movement. For example, the second master virtual object is a second virtual person, such as a simulated person role or a cartoon person role.

In one embodiment, the first virtual person role and the second virtual person role are located in the same virtual environment. In one embodiment, the first virtual person role and the second virtual person role may belong to the same team or the same organization, have a friend relationship, or have a temporary communication permission.

In one embodiment, the application programs installed on the first terminal 320 and the second terminal 360 are the same, or the application programs installed on the two terminals are the same type of application programs in different control system platforms. The first terminal 320 may be generally one of a plurality of terminals, and the second terminal 360 may be generally one of a plurality of terminals. In this embodiment, only the first terminal 320 and the second terminal 360 are used as an example for description. The first terminal 320 and the second terminal 360 are of the same or different device types. The device type includes at least one of a smartphone, a tablet computer, an e-book reader, a moving picture experts group audio layer III (MP3) player, a moving picture experts group audio layer IV (MP4) player, a laptop, and a desktop computer. The following embodiment is described by using an example that the terminal includes a smartphone.

A person skilled in the art may learn that there may be more or fewer terminals. For example, there may be only one terminal, or there may be dozens of or hundreds of terminals or more. The quantity and the device type of the terminals are not limited in the embodiments of the present disclosure.

Figure 4:
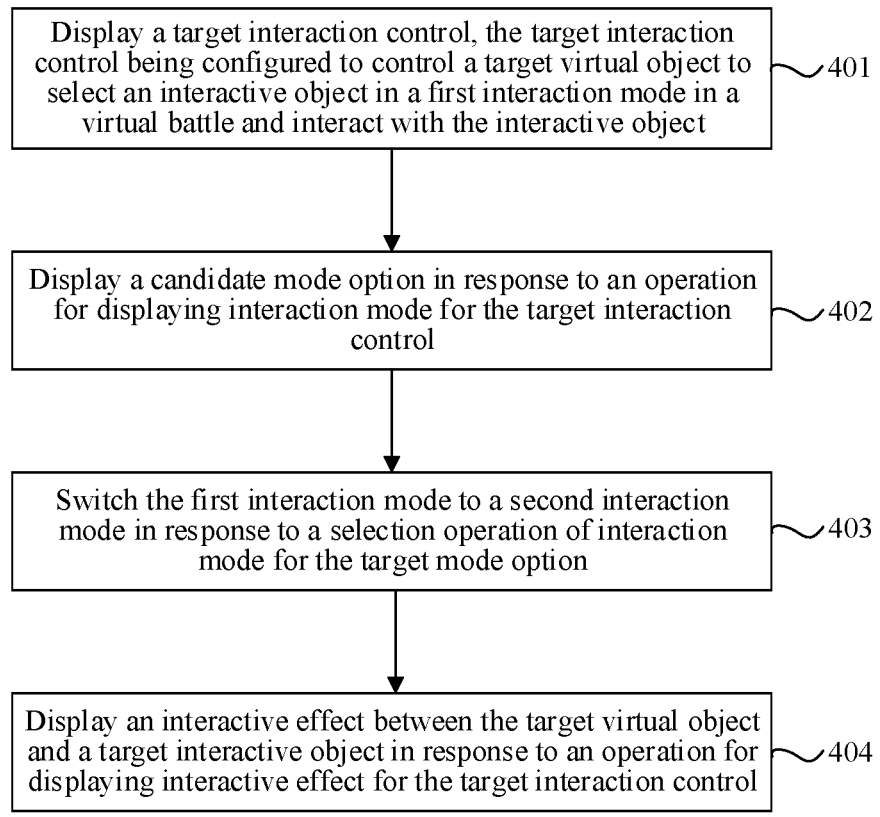
FIG. 4 is a flowchart of a method for selecting a virtual object interaction mode according to an exemplary embodiment of the present disclosure.

With reference to the foregoing explanation of terms and the description of the implementation environment, FIG. 4 is a flowchart of a method for selecting a virtual object interaction mode according to an exemplary embodiment of the present disclosure. The method applied to the first terminal 320, the second terminal 360, or another terminal in the computer system 300 shown in FIG. 3 is used as an example for description. As shown in FIG. 4, the method includes the following exemplary steps:

Step 401: Display a target interaction control, the target interaction control being configured to control a target virtual object to select an interactive object in a first interaction mode in a virtual battle and interact with the interactive object.

In the present disclosure, a virtual battle interface is displayed on a display interface of the terminal, and a virtual battle screen including a master virtual object is displayed on the virtual battle interface.

For example, in the virtual battle, a user can control the target virtual object to interact with the interactive object in the virtual battle by using the target interaction control. In one embodiment, the interactive object may be a heroic virtual object controlled by the user or artificial intelligence (AI). Alternatively, the interactive object may be a scene object in the virtual environment, such as a defense tower or an AI minion.

In the present disclosure, the interaction mode indicates a selection priority of the target virtual object when interacting with other virtual objects in the virtual battle. In an example, the interaction mode determines the selection priority according to a distance between the virtual objects. In the virtual environment, when there is one opposing virtual object at a distance of 50 meters from the target virtual object, and another opposing virtual object at a distance of 100 meters from the virtual object, and currently, the first interaction mode indicates that the target virtual object attacks a virtual object closer to the target virtual object first, the target virtual object attacks the virtual object at a distance of 50 meters when attacking according to an operation for displaying interactive effect.

In the present disclosure, each ability corresponds to an interaction form of the virtual object in the virtual battle, and each interaction form follows an interaction mode. In one embodiment, in the same virtual battle, the respective interaction modes corresponding to the abilities may be uniform, that is, the interaction modes of all the abilities are uniformly configured. Alternatively, the respective interaction modes corresponding to the abilities may be different, that is, the interaction modes of the abilities may be configured individually. For example, an ability 1 indicates that after an opposing virtual object is hit, the lower the health points of the opposing virtual object, the higher the damage caused. An ability 2 indicates that after an opposing virtual object is hit, the lower the health bar of the opposing virtual object, the higher the damage caused. An interaction mode 1 may be configured for the ability 1, and an interaction mode 2 may be configured for the ability 2, where the interaction mode 1 indicates that the ability 1 preferentially attacks an opposing virtual object with the lowest health points within a preset range, and the interaction mode 2 indicates that the ability 2 preferentially attacks an opposing virtual object with the lowest health bar within a preset range.

Step 402: Display a candidate mode option in response to an operation for displaying interaction mode for the target interaction control.

The candidate mode option includes a target mode option corresponding to a second interaction mode.

For example, the candidate mode option includes a history mode option. In one embodiment, the history mode option is a mode option corresponding to the first interaction mode. That is, the history mode option indicates an interaction mode corresponding to the virtual battle before the foregoing operation for displaying interaction mode is received by the target interaction control. Alternatively, the history mode option is a mode option that is determined according to user's historical setting information, and that corresponds to an interaction mode with a highest historical setting frequency.

In one embodiment, the operation for displaying interaction mode for the target interaction control can be received by a touch module corresponding to the target interaction control on the screen interface, or can be received by a physical button having a mapping relationship with the target interaction control. The physical button includes a shortcut key in a keyboard, a physical button on a terminal device, a physical button in a handle, and the like.

In one embodiment, the foregoing operation for displaying interaction mode may be implemented by a click operation, a long-press operation, a double-click operation (including at least one of a single-finger double-click operation or a double-finger double-click operation), a hover operation, a drag operation, and a combination thereof, which is not limited herein.

Figure 5:
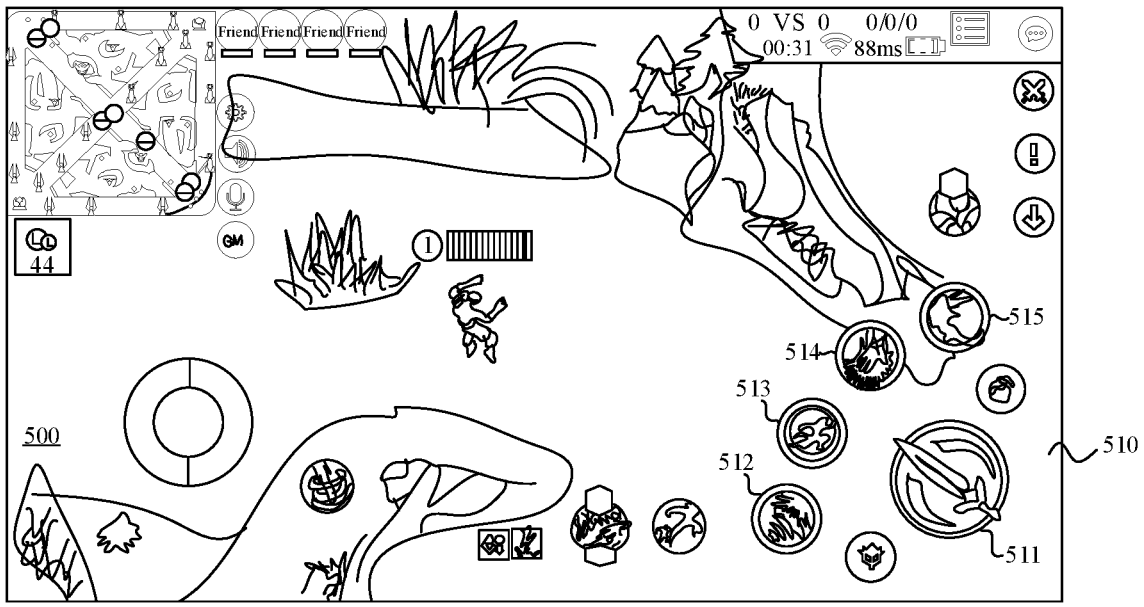
FIG. 5 is a schematic diagram of a virtual battle interface according to an exemplary embodiment of the present disclosure.

In the present disclosure, the target interaction control is configured to control the target virtual object to interact with the interactive object in a corresponding attack form in the virtual battle. For example, referring to FIG. 5, a virtual battle interface 500 has at least one interaction control. In the present disclosure, there are five interaction controls: a normal attack control 511, a first ability control 512, a second ability control 513, a third ability control 514, and a fourth ability control 515. The normal attack control 511 is configured to control a virtual object to perform a normal attack on another object in a virtual environment; the first ability control 512 is configured to control the virtual object to cast a first ability to another object in the virtual environment; the second ability control 513 is configured to control the virtual object to cast a second ability to another object in the virtual environment; the third ability control 514 is configured to control the virtual object to cast a third ability to another object in the virtual environment; and the fourth ability control 515 is configured to control the virtual object to cast a fourth ability to another object in the virtual environment. In one embodiment, in the present disclosure, the normal attack, the first ability, the third ability, and the fourth ability are all abilities for interacting with opposing virtual objects, and the second ability is an ability for interacting with friend virtual objects.

In some embodiments, the virtual battle interface includes a plurality of target interaction controls, each target interaction control corresponds to a display location, and the candidate mode option is displayed at a display location corresponding to the target interaction control. In one embodiment, a fan-shaped region panel is displayed on a peripheral side of the target interaction control with the target interaction control as a center, and the fan-shaped region panel includes the candidate mode option. Specifically, the center is a location of a center of a circle of the fan-shaped region panel. Alternatively, a switching path is displayed with the target interaction control as a path starting point, and an end point of the switching path is the candidate mode option. Alternatively, the candidate mode option is superimposed and displayed at a display location corresponding to the target interaction control. By directly displaying the candidate mode option on the peripheral side of the target interaction control, the user can directly complete switching of the interaction modes in the battle interface, which improves the switching efficiency of the interaction mode.

In the present disclosure, at least two sets of interaction modes are pre-stored in the terminal, and the at least two sets of interaction modes include the first interaction mode corresponding to the current virtual battle.

For example, the candidate interaction modes are determined from the at least two sets of interaction modes, and candidate interaction options corresponding to the candidate interaction modes are displayed in the interaction mode display region for a player to select.

In one embodiment, when the operation for displaying interaction mode is received, the at least two sets of interaction modes are displayed in different mode options in the interaction mode display region, that is, all the pre-stored interaction modes are displayed. In one embodiment, there is a priority correspondence between the at least two sets of interaction modes. When the operation for displaying interaction mode is received, mode options corresponding to a target quantity of candidate interaction modes with relatively high priorities are displayed. In one embodiment, the terminal selects data according to the history mode, and the data selected according to the history mode includes the number of historical selection times corresponding to each mode. When the operation for displaying interaction mode is received, mode options corresponding to a target quantity of candidate interaction modes with relatively high historical selection times are displayed. A correspondence between the quantity of displayed interaction modes and the quantity of interaction modes pre-stored in the terminal is not limited in the embodiments of the present disclosure.

In one embodiment, the candidate interaction mode does not include the history mode option corresponding to the first interaction mode. Alternatively, the candidate interaction mode includes the history mode option corresponding to the first interaction mode.

In the present disclosure, the interaction mode display region including the history mode option and the target mode option is used as an example. The history mode option is a display region for displaying the first interaction mode as described above, and the target mode option is a display region for displaying the candidate modes in the terminal.

Figure 6:
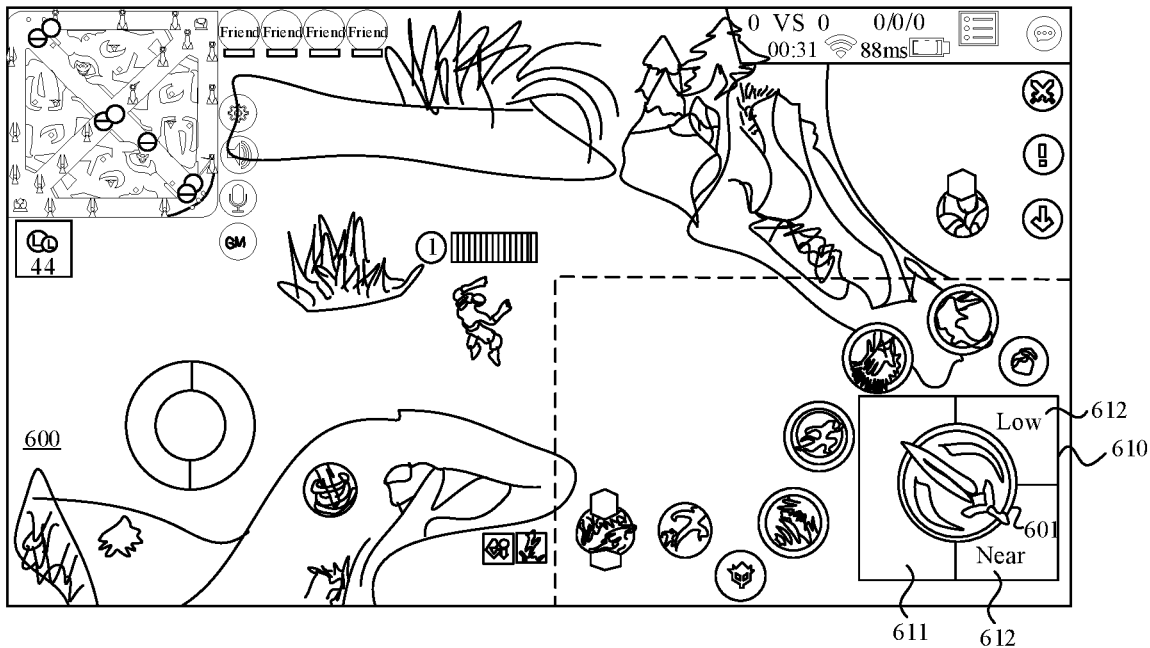
FIG. 6 is a schematic diagram of another virtual battle interface according to an exemplary embodiment of the present disclosure.

Referring to FIG. 6, in a virtual battle interface 600, a display location 610 is located on a peripheral side of a normal attack control 601, and a history mode option 611 and a target mode option 612 are included in the display location 610. An interaction mode corresponding to the history mode option 611 is the interaction mode followed by a current virtual object, that is, "preferentially attacking a nearest opponent". There are two target mode options 612, in one target mode option 612, the displayed interaction mode is "preferentially attacking an opponent with a smallest health point absolute value", and in the other target mode option 612, the displayed interaction mode is "preferentially attacking an opponent with low combat effectiveness".

Step 403: Switch the first interaction mode to a second interaction mode in response to a selection operation of interaction mode for the target mode option.

In the present disclosure, after the target mode option is selected, it indicates that the first interaction mode is to be switched to the second interaction mode. After the first interaction mode is switched to the second interaction mode, the virtual object determines an interactive object according to the second interaction mode and interacts with the interactive object within the remaining virtual battle time. The number of switching times for the interaction mode in a virtual battle is not limited in the embodiments of the present disclosure.

Step 404: Display an interactive effect between the target virtual object and a target interactive object in response to an operation for displaying interactive effect for the target interaction control.

The target interactive object is the interactive object determined according to the second interaction model.

In the present disclosure, the operation for displaying interaction mode is an operation for the target interaction control. In one embodiment, the operation for displaying interaction mode is different from the operation for displaying interactive effect, and the operation for displaying interactive effect is used for controlling the virtual object to interact in the attack form corresponding to the target interaction control. For example, the operation for displaying interactive effect and the operation for displaying interaction mode are different trigger operations for different functions of the same control, namely, a trigger operation of determining that the operation for displaying interaction mode is received in response to receiving a first trigger signal for the target interaction control, and displaying a candidate mode option at a display location corresponding to the target interaction control; and a trigger operation of determining that the operation for displaying interactive effect is received by the target interaction control in response to receiving a second trigger signal for the target interaction control, and displaying an interactive effect between the target virtual object and the target interactive object. That is, by means of the different triggering signals for the same control, the interaction mode can be adjusted or the interaction effect can be displayed, which increases an implementation function of a single control in the interface, and improves the utilization of the control, so that the interface does not need to display too many controls, and the problem that the virtual environment screen is blocked too much due to too many controls can be solved.

The first trigger signal and the second trigger signal are implemented by different operations. In an example, the operation for displaying interactive effect is implemented as a slide operation on the target interaction control, and the operation for displaying interaction mode is implemented as a press operation on the target interaction control. In another example, the operation for displaying interactive effect is a long-press operation for the target interaction control, and the long-press time is less than a time length threshold set in the terminal. The operation for displaying interaction mode is a long-press operation for the target interaction control, and the long-press time is greater than a time length threshold set in the terminal.

As such, according to the method provided in the embodiments of the present disclosure, during a virtual battle, when a target interaction form of a virtual object is to select an interactive object according to a first interaction mode to implement interaction with the interactive object, a candidate mode option is displayed after an operation for displaying interaction mode is received, a finally selected interaction mode is determined according to the selection operation of interaction mode, and subsequently, a corresponding target interactive object is determined according to a switched interaction mode when an operation for displaying interactive effect is received by the target interaction control. In the virtual battle, by means of an operation on the target interaction control on a virtual battle interface, a user can flexibly switch an interaction mode corresponding to a target interaction form according to a situation in the virtual battle, which improves the efficiency of human-computer interaction.

Figure 7:
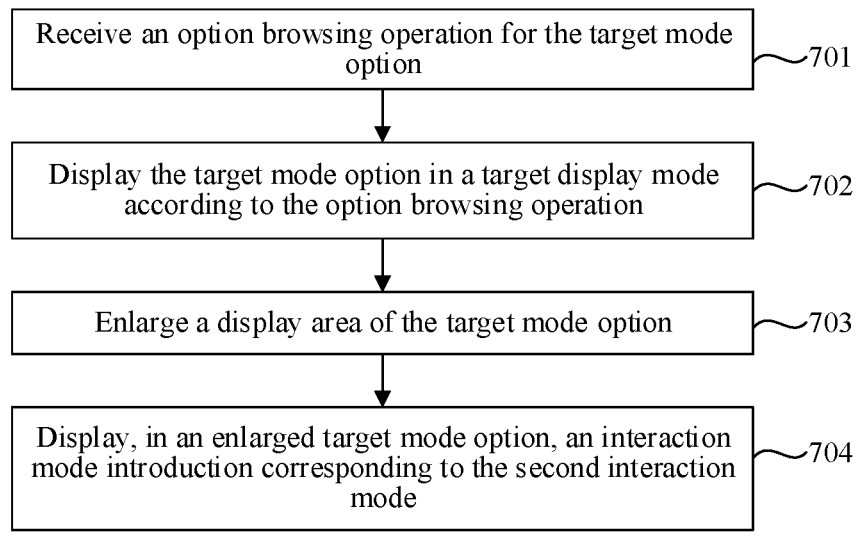
FIG. 7 is a flowchart of a method for selecting a virtual object interaction mode according to an exemplary embodiment of the present disclosure.

In some embodiments of the present disclosure, to enable the user to understand content of the interaction modes during switching among interaction modes, FIG. 7 is a flowchart of a method for selecting a virtual object interaction mode provided in an exemplary embodiment of the present disclosure. Steps corresponding to the method embodiment can be performed between step 402 and step 403. The method applied in a terminal is used as an example for description. As shown in FIG. 7, the method includes the following exemplary steps:

Step 701: Receive an option browsing operation for the target mode option.

In the present disclosure, after the interaction mode display region is displayed in the terminal, the interaction display region includes a plurality of candidate mode options, and the user needs to learn content of the second interaction mode corresponding to the target mode option. Therefore, a region browsing operation is used for providing the user with the content of a switched mode for confirming. That is, by means of the option browsing operation, an amount of information obtained by the user from the battle interface can be increased, and user experience can be improved.

The region browsing operation may be implemented by a click operation, a long-press operation, a double-click operation (including at least one of a single-finger double-click operation or a double-finger double-click operation), a hover operation, a drag operation, and a combination thereof, which is not limited herein.

Figure 8:
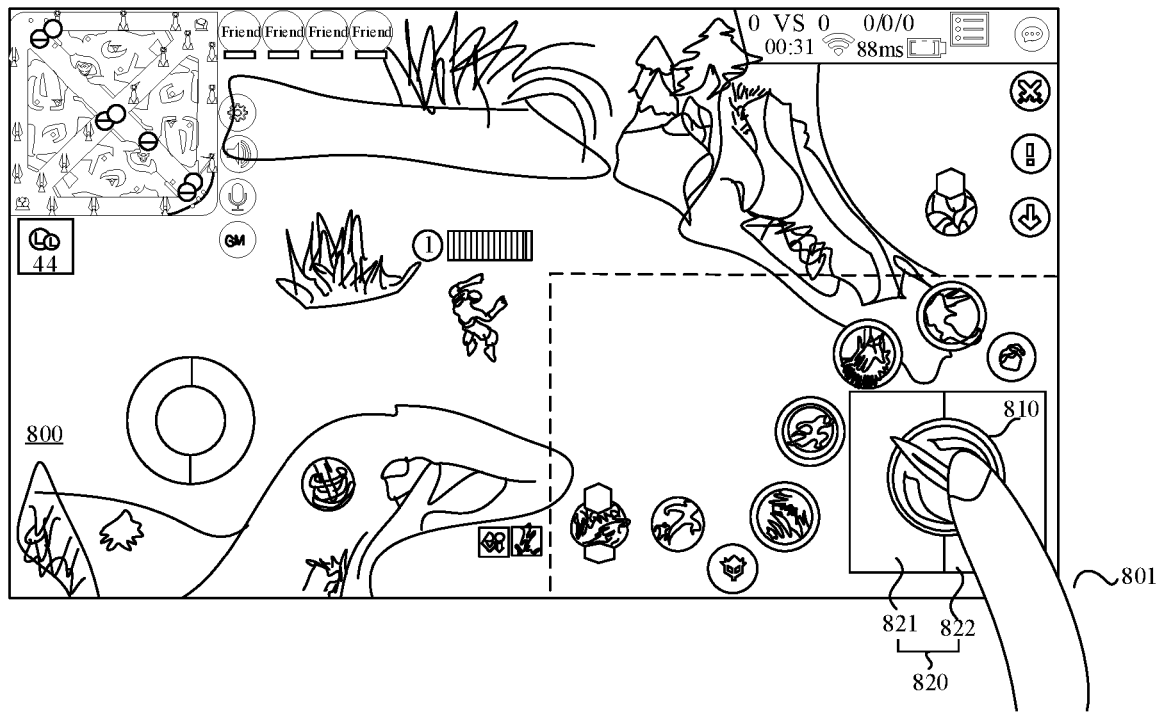
FIG. 8 is a schematic diagram of another virtual battle interface according to an exemplary embodiment of the present disclosure.

In the present disclosure, as described in the foregoing embodiments of the present disclosure, the operation for displaying interaction mode is a long-press operation for the target interaction control. Referring to FIG. 8, in a virtual battle interface 800, when a long-press operation 801 is received and a duration length of the long-press operation 801 is greater than a preset time length threshold, an interaction mode display region 820 can be displayed at a preset display location corresponding to a target interaction control 810, and the interaction mode display region includes a history mode option 821 and a target mode option 822. In one embodiment, in the present disclosure, the display location is on the peripheral side of the target interaction control, and in the interaction mode display region 820, the history mode option 821 and the target mode option 822 are each displayed in the form of a fan-shaped display panel in the virtual battle interface 800.

In the present disclosure, the option browsing operation is an operation that continues the operation for displaying interaction mode. In an example, the operation for displaying interaction mode is a long-press operation for the target interaction control. In this case, the option browsing operation continues immediately after the long-press operation. For example, the option browsing operation is a drag operation in the interaction mode display region. In this case, a starting point of the drag operation is the location of the target interaction control, and an end point of the drag operation is the location of the target mode option.

Step 702: Display the target mode option in the target display mode according to the option browsing operation.

In the present disclosure, in response to the option browsing operation, the corresponding target mode option is embodied in a highly recognizable visual form. In one embodiment, the target mode includes increasing display brightness of the target mode option. Alternatively, the target display mode includes displaying a pattern identifier for the target mode option. Alternatively, the target display mode includes displaying the target mode option in a stroked manner.

In one embodiment, the increasing display brightness of the target mode option includes increasing edge brightness of the target mode option, and/or increasing center brightness of the target mode option.

Step 703: Enlarge a display area of the target mode option.

In the present disclosure, highlighting of the target mode option further includes enlarging a display area of the target mode option. After the display area of the target mode option is enlarged, the target mode option occupies a larger space in the virtual battle interface. That is, by enlarging the display area of the target mode option, the visibility of the target mode option is improved, and the user can easily perform subsequent operations, which improves the user experience.

Step 704: Display, in an enlarged target mode option, an interaction mode introduction corresponding to the second interaction mode.

Figure 9:
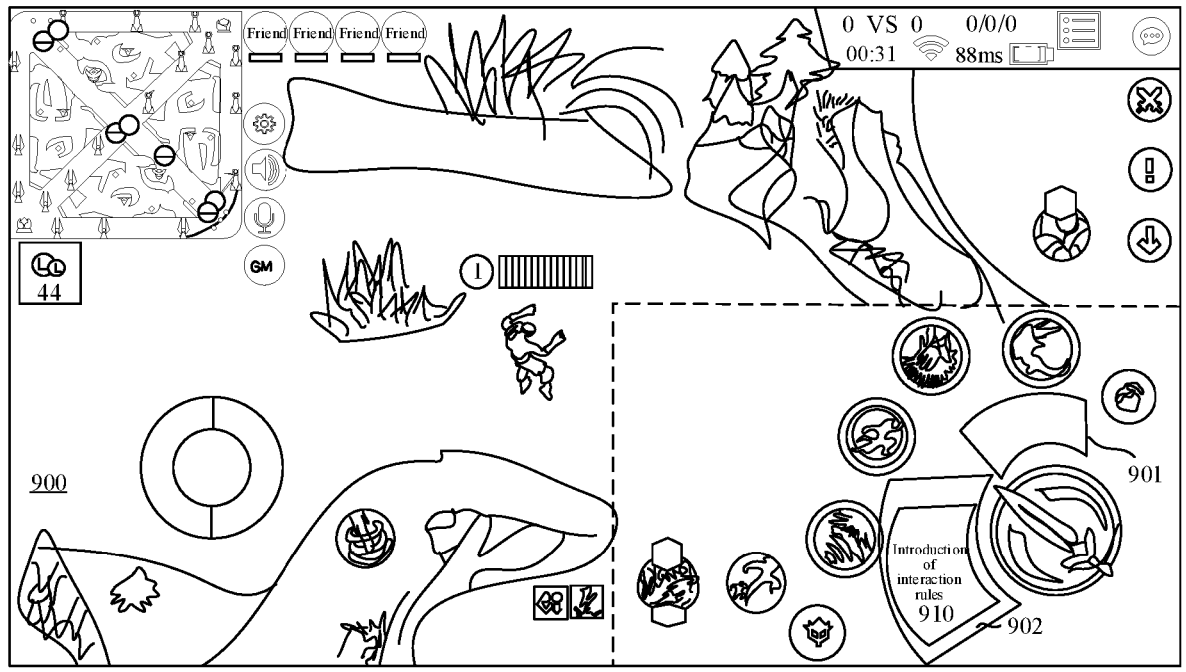
FIG. 9 is a schematic diagram of another virtual battle interface according to an exemplary embodiment of the present disclosure.

Referring to FIG. 9, in a virtual battle interface 900, a history mode option 901 and a target mode option 902 are displayed according to an operation for displaying interaction mode. Because the region browsing operation is an operation for browsing the target mode option 902, the target mode option 902 is highlighted, and after the highlighting, an interaction mode introduction 910 is correspondingly displayed in the target mode option 902. In this example, the target mode option 902 is an interaction mode which indicates that an opposing virtual object with low health points is preferentially attacked. Meanwhile, in the virtual environment, when an opposing virtual object is too close to the master virtual object, the opposing virtual object is still attacked. Therefore, the foregoing mode is introduced in the interaction mode introduction 910.

As such, according to the method provided in the embodiments of the present disclosure, during a virtual battle, when a target interaction form of a virtual object is to select an interactive object according to a first interaction mode to implement interaction with the interactive object, a candidate mode option is displayed after an operation for displaying interaction mode for a target interaction control is received, a finally selected interaction mode is determined according to the selection operation of interaction mode, and subsequently, a corresponding target interactive object is determined according to a switched interaction mode when an operation for displaying interactive effect is received by the target interaction control. In the virtual battle, by means of an operation on the target interaction control on a virtual battle interface, a user can flexibly switch an interaction mode corresponding to a target interaction form according to a situation in the virtual battle, which improves the efficiency of human-computer interaction.

In the method provided in the present disclosure, in a process of selecting an interaction mode by the user, a mode switching trend of the user is determined according to an action of the user before a switched mode is selected, a corresponding mode option is highlighted according to the switching trend, and content of a corresponding interaction mode is displayed in the form of an introduction. Therefore, the user learns the interaction mode to be followed by the virtual object, which further improves the efficiency of human-computer interaction.

Figure 10:
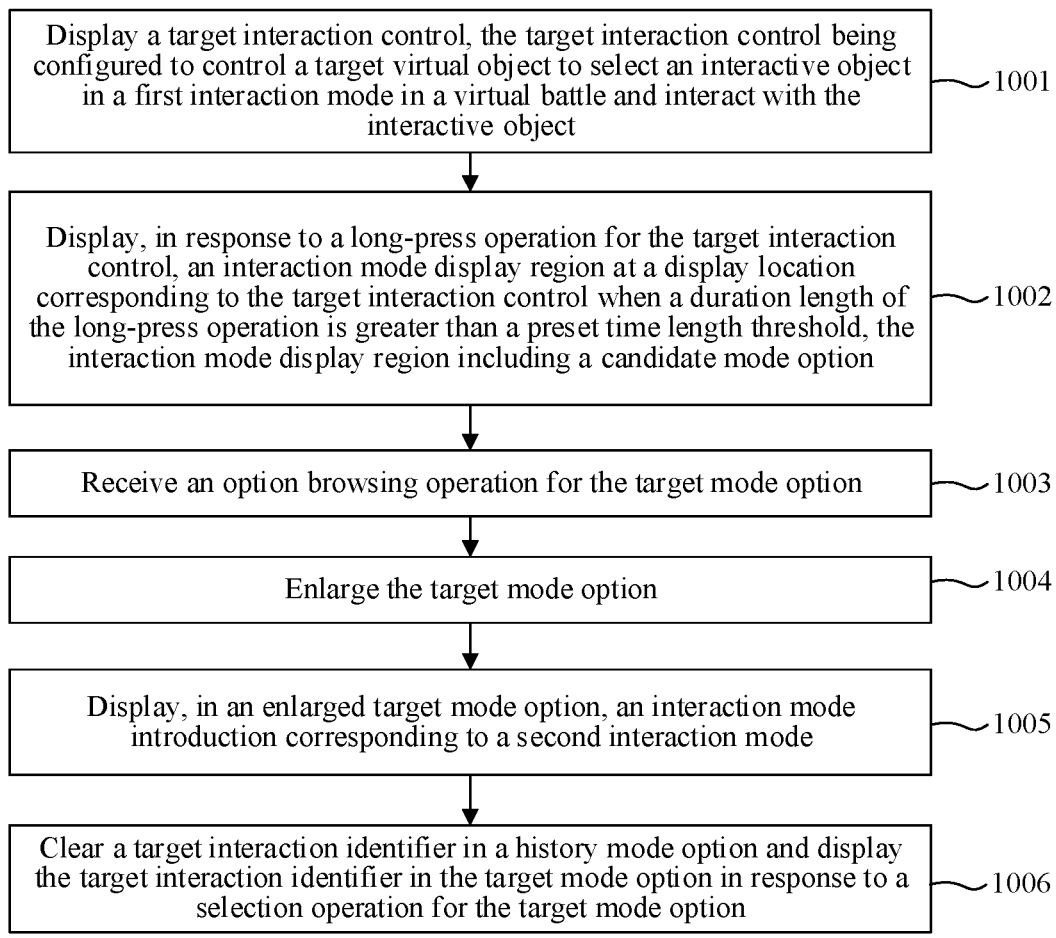
FIG. 10 is a schematic diagram of a method for selecting a virtual object interaction mode according to an exemplary embodiment of the present disclosure.

In some embodiments, the switching of the interaction mode is displayed at the interaction mode option during the switching process, so as to prompt the interaction mode currently followed by the interaction form. FIG. 10 is a schematic diagram of a method for selecting a virtual object interaction mode according to an exemplary embodiment of the present disclosure. The method applied to a terminal is used as an example for description. The method includes:

Step 1001: Display a target interaction control, the target interaction control being configured to control a target virtual object to select an interactive object in a first interaction mode in a virtual battle and interact with the interactive object.

The target virtual object determines a priority of each candidate interactive object in the virtual battle according to an interaction mode, and the candidate interactive object is a virtual object that satisfies a condition for interacting with the target virtual object. In some embodiments, the interaction mode includes at least one of a distance priority mode, a numerical value priority mode, a percentage priority mode, or a level priority mode. The distance priority mode includes determining a priority of each candidate interactive object according to a distance between the target virtual object and each candidate interactive object. For example, the distance between the target virtual object and each candidate interactive object is negatively correlated with the priority, that is, the closer the distance between each candidate interactive object and the target virtual object, the higher the corresponding priority. The numerical value priority mode includes determining a priority of each candidate interactive object according to a numerical value of an attribute value of each candidate interactive object. The attribute value includes, but is not limited to, a health point and a magic point. For example, the numerical value of the attribute value of each candidate interactive object is negatively correlated with the priority, that is, the lower the numerical value of the attribute value of each candidate interactive object, the higher the corresponding priority. The percentage priority mode includes determining a priority of each candidate interactive objects according to a percentage of an attribute value of each candidate interactive object. For example, the percentage of the attribute value of each candidate interactive object is negatively correlated with the priority, that is, the lower the percentage of the attribute value of each candidate interactive object, the higher the corresponding priority; The level priority mode includes determining a priority of each candidate interactive object according to a level of each candidate interactive object. For example, the level of each candidate interactive object is negatively correlated with the priority, that is, the lower the level of each candidate interactive object, the higher the corresponding priority. The user can select a corresponding interaction mode according to his/her needs from the plurality of interaction modes provided above, so that the accuracy of determining of an interactive object can be improved when interaction is performed through the target interaction control.

In one embodiment, for opposing virtual objects and friend virtual objects that appear in the virtual battle, different interaction modes are set in the terminal. In an example, for the opposing virtual objects, the provided interaction modes are "preferentially attacking a target with a small health point absolute value", "preferentially attacking a target with a low health bar" and "preferentially attacking a target closer to the virtual object". Meanwhile, for the friend virtual objects, the provided interaction modes are "preferentially healing a target with a smaller health point absolute value", "preferentially healing a target with a low health bar", and "preferentially giving a prop to a target closest to the virtual object". When the virtual object interacts with different targets, the interaction modes followed by the virtual object are also different. That is, the interaction mode includes at least one of a player-to-enemy interaction mode or a player-to-friend interaction mode, where the player-to-enemy interaction mode includes a priority of the virtual object attacking opposing virtual objects of different camps in the virtual battle; and the player-to-friend interaction mode includes a priority of the virtual object interacting with friend virtual objects of the same camp in the virtual battle. That is, by providing the player-to-enemy interaction mode and the player-to-friend interaction mode, the accuracy of the target interaction in determining an interactive object can be further improved. In the present disclosure, a manner in which the virtual object interacts with another virtual object in the virtual battle includes casting, by the virtual object, an ability to the another virtual object in the virtual battle. Correspondingly, the target interaction control is a control for controlling the target virtual object to cast an ability. In other embodiments of the present disclosure, a manner in which the virtual object interacts with another virtual object in the virtual battle is performing a normal attack. Correspondingly, the target interaction control is a normal attack control.

In the present disclosure, the interaction form corresponding to each target interaction control of the virtual object may follow a different interaction mode.

Step 1002: Display, in response to a long-press operation for the target interaction control, an interaction mode display region at a display location corresponding to the target interaction control when a duration length of the long-press operation is greater than a preset time length threshold, the interaction mode display region including a candidate mode option.

Figure 11:
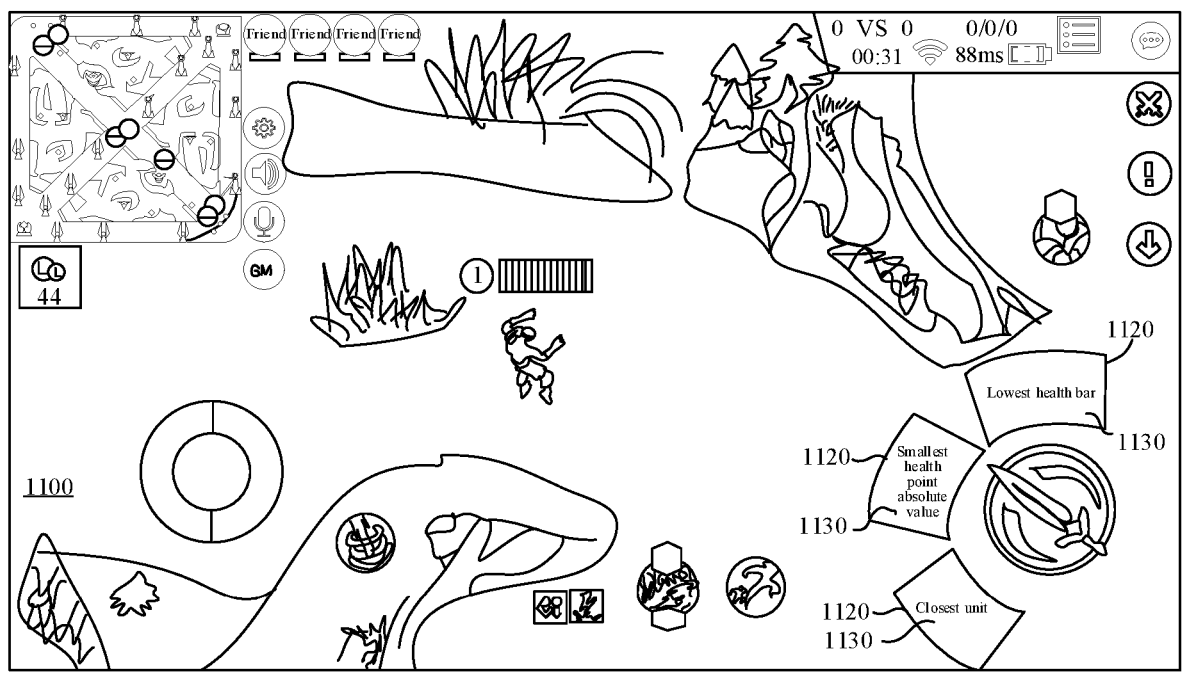
FIG. 11 is a schematic diagram of another virtual battle interface according to an exemplary embodiment of the present disclosure.

In the present disclosure, the operation for displaying interaction mode is a long-press operation, and the duration length of the long-press operation is greater than the preset time length threshold. After the long-press operation, referring to FIG. 11, an interaction mode display region is displayed on a peripheral side of a target interaction control 1110 in a virtual environment interface 1100, the interaction mode display region includes at least two fan-shaped mode options 1120, and each mode option 1120 has an interaction mode identifier 1130 corresponding to an interaction mode. In one embodiment, the interaction mode identifier 1130 is a text identifier.

Step 1003: Receive an option browsing operation for the target mode option.

In the present disclosure, the option browsing operation only affects content in the interaction mode display region. In one embodiment, by means of the option browsing operation, the content in the interaction mode display region that corresponds to the target mode option is displayed at display brightness higher than normal display brightness.

Step 1004: Enlarge a display area of the target mode option.

After the brightness of the target mode option is increased, in the present disclosure, the display area of the target mode option is further enlarged.

In the present disclosure, to display the corresponding target mode option in an enlarged manner and in a brightness-increasing manner, the user needs to perform a continuous press operation on the target mode option, and the continuous press operation is a continuation of a drag operation.

Step 1005: Display, in an enlarged target mode option, an interaction mode introduction corresponding to a second interaction identifier.

In the present disclosure, the enlarging a display area of the target mode option in step 1004 is performed to adapt to display of the interaction mode introduction. In the enlarged target mode option, the user can obtain introduction content of the interaction mode.

The interaction model introduction is not a complete introduction for all mechanisms of the interaction model.

Step 1006: Clear a target interaction identifier in a history mode option and display the target interaction identifier in the target mode option in response to a selection operation of interaction mode for the target mode option.

In the present disclosure, the target interaction control has a target interaction identifier, and the target interaction identifier is displayed in the target interaction control. In addition, in the present disclosure, the interaction mode display region includes a history mode option corresponding to a first interaction mode, that is, in response to receiving the operation for displaying interaction mode, the interaction mode display region is displayed at a display location corresponding to the target interaction control, where the interaction mode display region includes the history mode option corresponding to the first interaction mode, and a target interaction mode option corresponding to a candidate second interaction mode. The history mode option includes the foregoing target interaction identifier, and the target interaction identifier displayed in the history mode option is used for indicating that a current target virtual object determines an interactive object in an interaction mode indicated by the target interaction identifier. The history mode option is distinguished from the target mode option only from logic. In a process of displaying a virtual battle screen, the user cannot clearly distinguish the history mode option and the target mode option. Therefore, by marking the target interactive identifier in the history mode option, the user can quickly identify the currently used interaction mode and perform mode selection, which improves the efficiency of interaction mode switching. In addition, after the mode is switched, the target interaction identifier is cleared or removed from the history mode option and displayed in the target mode option, so that the user can learn that the mode switching has been completed.

Figure 12:
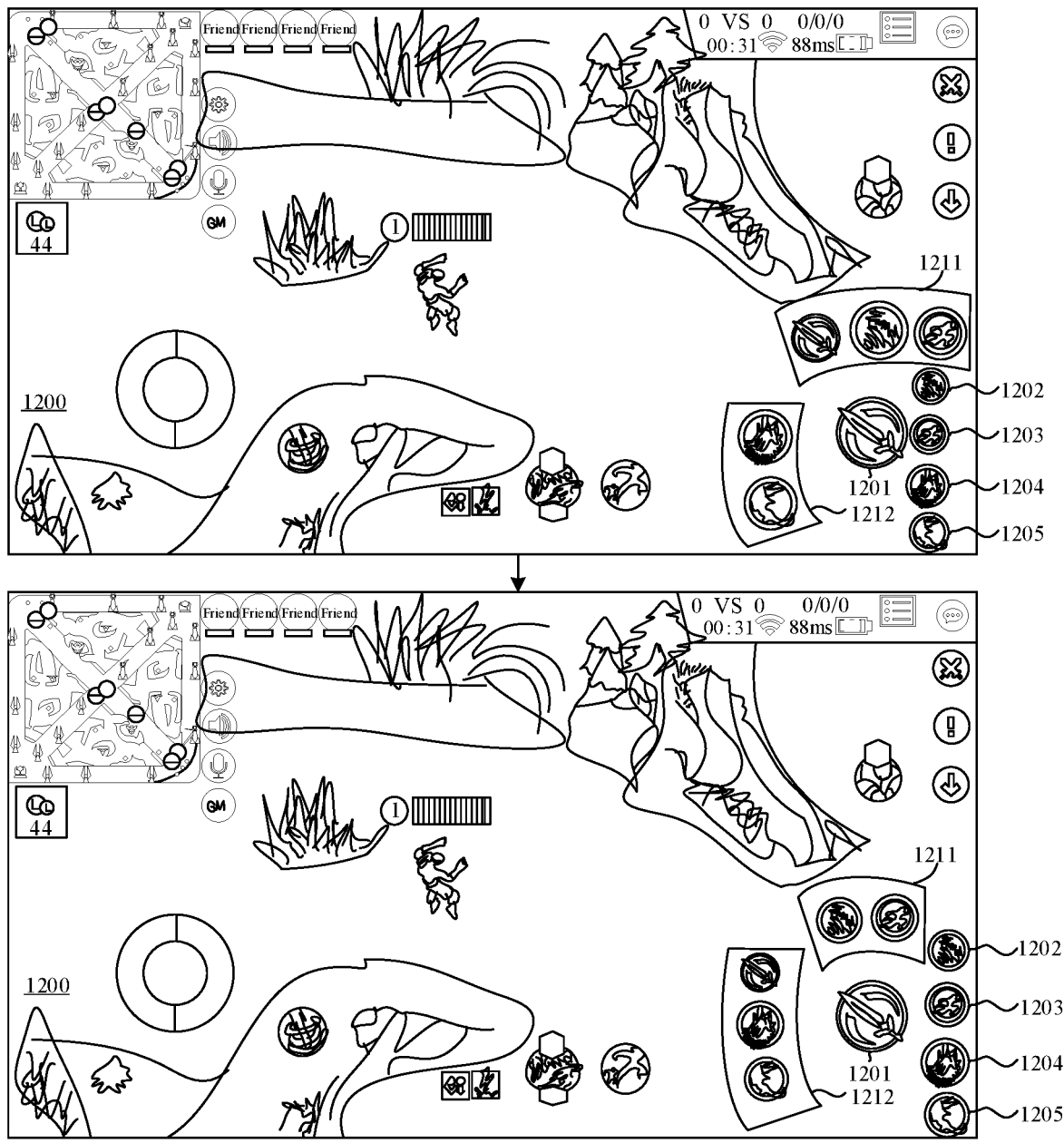
FIG. 12 is a schematic diagram of another virtual battle interface according to an exemplary embodiment of the present disclosure.

In the present disclosure, before the interaction mode is switched, as shown in FIG. 12, the target interaction identifier corresponding to the target interaction control is displayed in the history mode option. Referring to FIG. 12, there are a total of five target interaction controls in a virtual battle interface 1200. The five target interaction controls each include a target interaction identifier 1201, a target interaction identifier 1202, a target interaction identifier 1203, a target interaction identifier 1204, and a target interaction identifier 1205. In response to an operation for displaying interaction mode for a target interaction control corresponding to the target interaction identifier 1201, a history mode option 1211 and a target mode option 1212 are displayed in a corresponding region of the target interaction control. In this case, the history mode option 1211 includes the target interaction identifier 1201, the target interaction identifier 1202, and the target interaction identifier 1203, and the target mode option 1212 includes the target interaction identifier 1204 and the target interaction identifier 1205. This display mode indicates that the target interaction identifier 1201, the target interaction identifier 1202, and the target interaction identifier 1203 follow the first interaction mode, and the target interaction identifier 1204 and the target interaction identifier 1205 follow the second interaction mode. In this case, in response to a selection operation for the target mode option 1212, the first interaction mode display region 1211 includes the target interaction identifier 1202 and the target interaction identifier 1203, and the second interaction mode display region includes the target interaction identifier 1201, the target interaction identifier 1204, and the target interaction identifier 1205.

In the present disclosure, the selection operation of interaction mode is a continuation of the corresponding option browsing operation. After the option browsing operation, it is determined that the selection operation of interaction mode is received when a signal of releasing pressing is received by the terminal.

As such, according to the method provided in the embodiments of the present disclosure, during a virtual battle, when a target interaction form of a virtual object is to select an interactive object according to a first interaction mode to implement interaction with the interactive object, a candidate mode option is displayed after an operation for displaying interaction mode for a target interaction control is received, a finally selected interaction mode is determined according to the selection operation of interaction mode, and subsequently, a corresponding target interactive object is determined according to a switched interaction mode when an operation for displaying interactive effect is received by the target interaction control. In the virtual battle, by means of an operation on the target interaction control on a virtual battle interface, a user can flexibly switch an interaction mode corresponding to a target interaction form according to a situation in the virtual battle, which improves the efficiency of human-computer interaction.

In the method provided in the present disclosure, in a process of selecting an interaction mode by the user, a mode switching trend of the user is determined according to an action of the user before a switched mode is selected, a corresponding mode option is highlighted according to the switching trend, and content of a corresponding interaction mode is displayed in the form of an introduction. Therefore, the user learns the interaction mode to be followed by the virtual object, which further improves the efficiency of human-computer interaction.

In the method provided in the present disclosure, by displaying, in the mode option, the virtual mode to be followed by the interaction form corresponding to the virtual object in detail, the user can learn the current interaction mode corresponding to various interaction forms in the process of interaction mode switching, which further improves the efficiency of human-computer interaction.

Figure 13:
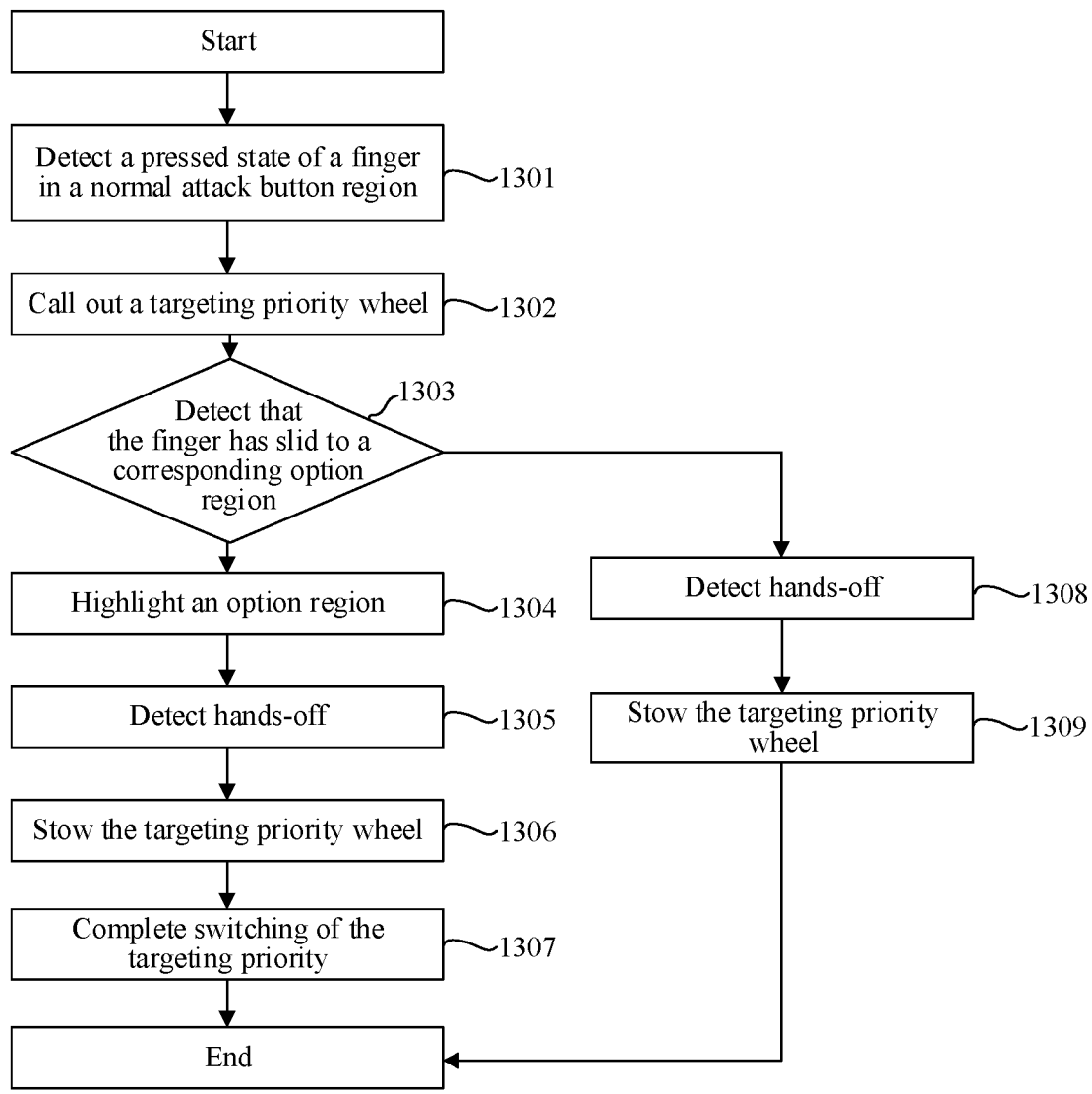
FIG. 13 is a schematic diagram of a process of a method for selecting a virtual object interaction mode according to an exemplary embodiment of the present disclosure.

FIG. 13 is a schematic diagram of a process of a method for selecting a virtual object interaction mode according to an exemplary embodiment of the present disclosure. The method applied to the terminal is used as an example for description. The process includes the following exemplary steps:

Step 1301: Detect a pressed state of a finger in a normal attack button region.

In this process, the normal attack button is a button for performing a normal attack, and is also a target interaction control in the virtual battle interface. This process is a process of detecting an operation on the target interaction control.

Optionally, in the virtual battle, the target interaction control is always displayed in the virtual battle screen.

Step 1302: Call out a targeting priority wheel.

This process is a process in which the terminal detects the operation for displaying interaction mode, and displays the interaction mode display region at a display location corresponding to the target interaction control.

Step 1303: Detect that the finger has slid to a corresponding option region.

In the present disclosure, the corresponding option includes the history mode option and the target mode option. The user's finger is always pressed on the screen in the sliding process, that is, this process is a continuation of the operation for displaying interaction mode.

When it is detected that the finger has slid to the corresponding option region, step 1304 is performed.

Step 1304: Highlight an option region.

This process is a process of highlighting the target mode option after the option browsing operation is received by the target mode option.

Step 1305: Detect hands-off.

This process is a process in which the terminal receives the selection operation of interaction mode and switches between the interaction modes. In the present disclosure, the selection operation of interaction mode is a hands-off operation performed after the option browsing operation. After the user releases his/her hand, the terminal switches between the interaction modes according to the selection operation of interaction mode.

Step 1306: Stow the targeting priority wheel.

This process is a process of canceling the interaction mode display region after the switching between the interaction modes is performed.

Step 1307: Complete switching of the targeting priority.

When it is detected that the finger has not slid to the corresponding option region, step 1308 is performed.

Step 1308: Detect hands-off.

This process is a process in which the region selection is not received. In this process, the display of the interaction mode display region is directly canceled, and the user can control the virtual object to continue the virtual battle.

Step 1309: Stow the targeting priority wheel.

As such, according to the method provided in the embodiments of the present disclosure, during a virtual battle, when a target interaction form of a virtual object is to select an interactive object according to a first interaction mode to implement interaction with the interactive object, a candidate mode option is displayed after an operation for displaying interaction mode for a target interaction control is received, a finally selected interaction mode is determined according to the selection operation of interaction mode, and subsequently, a corresponding target interactive object is determined according to a switched interaction mode when an operation for displaying interactive effect is received by the target interaction control. In the virtual battle, by means of an operation on the target interaction control on a virtual battle interface, a user can flexibly switch an interaction mode corresponding to a target interaction form according to a situation in the virtual battle, which improves the efficiency of human-computer interaction.

Figure 14:
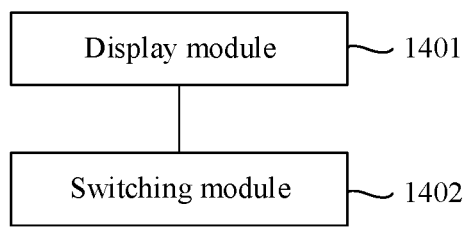
FIG. 14 is a structural block diagram of an apparatus for selecting a virtual object interaction mode according to an exemplary embodiment of the present disclosure.

FIG. 14 is a structural block diagram of an apparatus for selecting a virtual object interaction mode according to an exemplary embodiment of the present disclosure. As shown in FIG. 14, the apparatus includes:

a display module 1401, configured to display a target interaction control, the target interaction control being configured to control a target virtual object to select an interactive object in a first interaction mode in a virtual battle and interact with the interactive object;

the display module 1401 being further configured to display a candidate mode option in response to an operation for displaying interaction mode for the target interaction control, the candidate mode option including a target mode option, and the target mode option corresponding to a second interaction mode;

a switching module 1402, configured to switch the first interaction mode to the second interaction mode in response to a selection operation of interaction mode for the target mode option; and the display module 1401 being further configured to display an interactive effect between the target virtual object and a target interactive object in response to an operation for displaying interactive effect for the target interaction control, the target interactive object being an interactive object determined according to the second interaction mode.

Figure 15:
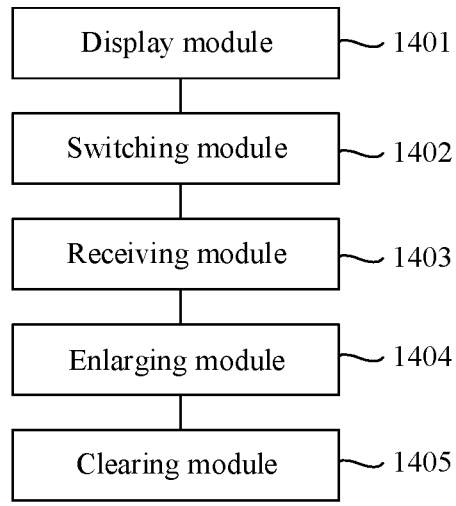
FIG. 15 is a structural block diagram of an apparatus for selecting a virtual object interaction mode according to another exemplary embodiment of the present disclosure.

In one embodiment, referring to FIG. 15, the apparatus further includes a receiving module 1403, configured to determine, in response to a first trigger signal for the target interaction control, that the operation for displaying interaction mode is received; and the display module 1401 being further configured to display the candidate mode option at a display location corresponding to the target interaction control.

In one embodiment, the display module 1401 is further configured to display a fan-shaped region panel, which includes the candidate mode option, on a peripheral side of the target interaction control with the target interaction control as a center. Alternatively, the display module 1401 is further configured to display a switching path with the target interaction control as a path starting point, an end point of the switching path being the candidate mode option. Alternatively, the display module 1401 is further configured to superimpose and display the candidate mode option at a display location corresponding to the target interaction control.

In one embodiment, the receiving module 1403 is further configured to receive an option browsing operation for the target mode option.

The display module 1401 displays the target mode option in a target display mode according to the option browsing operation, where the target display mode includes increasing display brightness of the target mode option; or, the target display mode includes displaying a pattern identifier for the target mode option; or, the target display mode includes stroke displaying the target mode option in.

In one embodiment, the interaction mode has an interaction mode introduction.

The apparatus further includes an enlarging module 1404, configured to enlarge a display area of the target mode option; and the display module 1401 being further configured to display, in an enlarged target mode option, an interaction mode introduction corresponding to the second interaction mode.

In one embodiment, the target interaction control has a target interaction identifier displayed therein, the candidate mode option further includes a history mode option corresponding to the first interaction mode, and the history mode option includes a target interaction identifier that is configured to indicate that the target virtual object determines an interactive object in an interaction mode indicated by the target interaction identifier.

In one embodiment, the apparatus further includes a clearing module 1405, configured to clear the target interaction identifier in the history mode option and display the target interaction identifier in the target mode option.

In one embodiment, the receiving module 1403 is further configured to determine, in response to a second trigger signal for the target interaction control, that the operation for displaying interactive effect is received by the target interaction control; and the display module 1401 is further configured to display an interactive effect between the target virtual object and the target interactive object.

In one embodiment, an interaction mode includes at least one of a player-to-enemy interaction mode or a player-to-friend interaction mode, where the player-to-enemy interaction mode includes a priority of the virtual object attacking opposing virtual objects of different camps in the virtual battle; and the player-to-friend interaction mode includes a priority of the virtual object interacting with friend virtual objects of the same camp in the virtual battle.

In one embodiment, the target virtual object determines a priority of each candidate interactive object in the virtual battle according to an interaction mode, the candidate interactive object is a virtual object that satisfies a condition for interacting with the target virtual object, and the interaction mode includes at least one of a distance priority mode, a numerical value priority mode, a percentage priority mode, or a level priority mode, where the distance priority mode includes determining a priority of each candidate interactive object according to a distance between the target virtual object and each candidate interactive object;

the numerical value priority mode includes determining a priority of each candidate interactive object according to a numerical value of an attribute value of each candidate interactive object;

the percentage priority mode includes determining a priority of each candidate interactive object according to a percentage of an attribute value of each candidate interactive object; and the level priority mode includes determining a priority of each candidate interactive object according to a level of each candidate interactive object.

As such, according to the method provided in the embodiments of the present disclosure, during a virtual battle, when a target interaction form of a virtual object is to select an interactive object according to a first interaction mode to implement interaction with the interactive object, a candidate mode option is displayed after an operation for displaying interaction mode for the target interaction control is received, a finally selected interaction mode is determined according to the selection operation of interaction mode, and subsequently, a corresponding target interactive object is determined according to a switched interaction mode when an operation for displaying interactive effect is received by the target interaction control. In the virtual battle, by means of an operation on the target interaction control on a virtual battle interface, a user can flexibly switch an interaction mode corresponding to a target interaction form according to a situation in the virtual battle, which improves the efficiency of human-computer interaction.

The apparatus for selecting a virtual object interaction mode provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the content described above.

The present disclosure further provides a terminal, the terminal includes a processor and a memory, the memory stores at least one instruction, and the at least one instruction is loaded and executed by the processor to implement steps of the method for selecting a virtual object interaction mode performed by the first terminal or by the second terminal. The terminal may be a terminal provided in FIG. 16 below.

Figure 16:
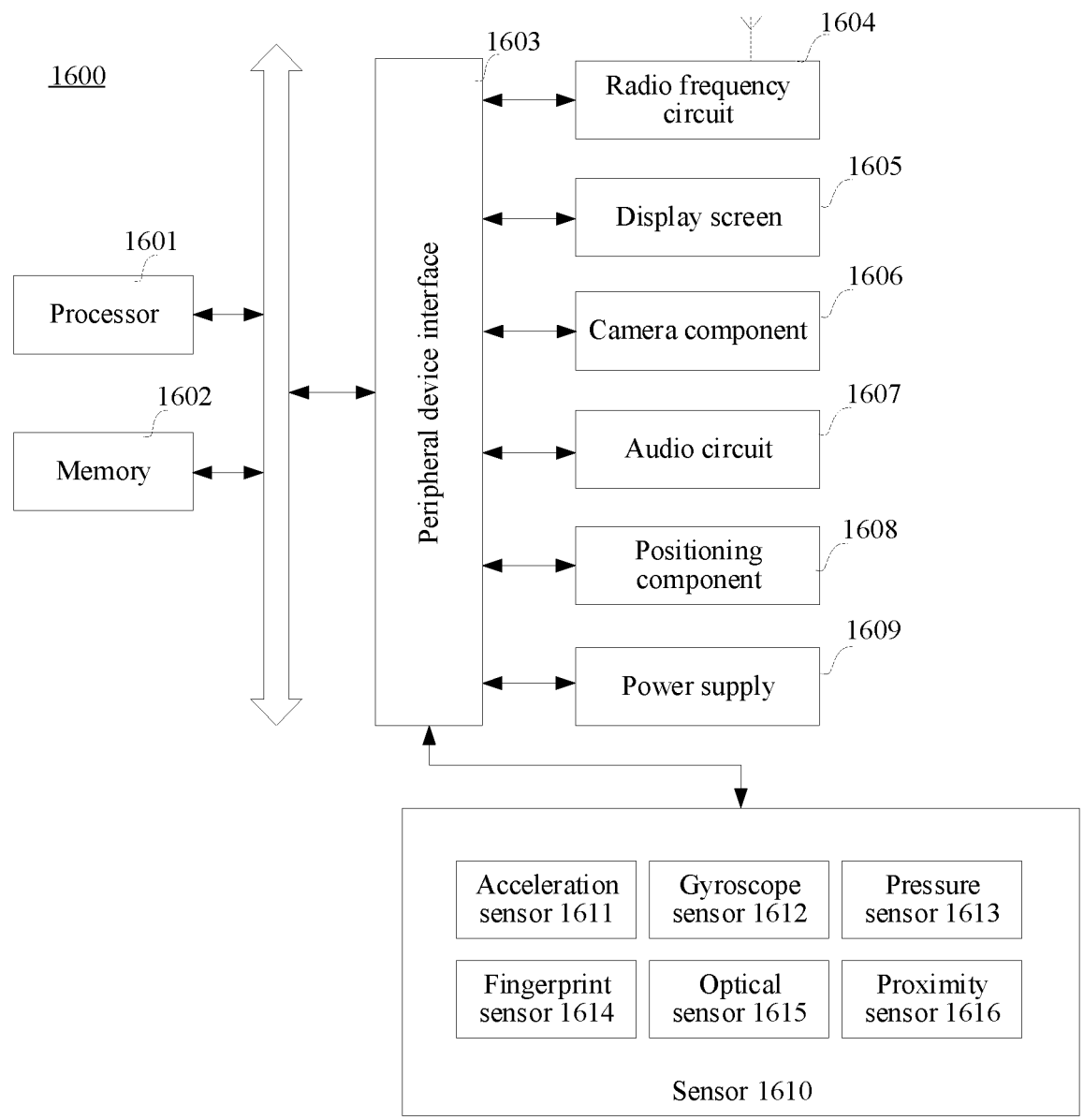
FIG. 16 is a structural block diagram of a terminal according to an exemplary embodiment of the present disclosure.

FIG. 16 is a structural block diagram of a terminal 1600 according to an exemplary embodiment of the present disclosure. The terminal 1600 may be a smartphone, a tablet computer, an MP3 player, an MP4 player, a notebook computer, or a desktop computer.

Generally, the terminal 1600 includes a processor 1601 and a memory 1602.

The processor 1601 may include one or more processing cores, for example, a 4-core processor or an 8-core processor.

The memory 1602 may include one or more computer-readable storage media. The computer-readable storage medium may be non-transient. In some embodiments, a non-transitory computer-readable storage medium in the memory 1602 is configured to store at least one instruction, the at least one instruction being configured to be executed by the processor 1601 to implement the method for selecting a virtual object interaction mode provided in the method embodiments of the present disclosure.

In some embodiments, the terminal 1600 may optionally include: a peripheral device interface 1603 and at least one peripheral device. The processor 1601, the memory 1602, and the peripheral device interface 1603 may be connected by using a bus or a signal cable. Each peripheral device may be connected to the peripheral device interface 1603 by using a bus, a signal cable, or a circuit board. Specifically, the peripheral device includes: at least one of a radio frequency (RF) circuit 1604, a touch display screen 1605, a camera component 1606, an audio circuit 1607, a positioning component 1608, and a power supply 1609.

The peripheral device interface 1603 may be configured to connect the at least one peripheral device related to input/output (I/O) to the processor 1601 and the memory 1602.

The RF circuit 1604 is configured to receive and transmit an RF signal, also referred to as an electromagnetic signal. The RF circuit 1604 communicates with a communication network and other communication devices through the electromagnetic signal.

The display screen 1605 is configured to display a user interface (UI). The UI may include a graph, text, an icon, a video, and any combination thereof.

The camera component 1606 is configured to capture images or videos.

The audio circuit 1607 may include a microphone and a speaker.

The positioning assembly 1608 is configured to determine a current geographic location of the terminal 1600, to implement navigation or a location based service (LBS).

The power supply 1609 is configured to supply power to components in the terminal 1600.

In some embodiments, the terminal 1600 may also include one or more sensors 1610. The one or more sensors 1610 include, but are not limited to: an acceleration sensor 1611, a gyroscope sensor 1612, a pressure sensor 1613, a fingerprint sensor 1614, an optical sensor 1615, and a proximity sensor 1616.

A person skilled in the art may understand that a structure shown in FIG. 16 constitutes no limitation on the terminal 1600, and the terminal may include more or fewer components than those shown in the figure, or some components may be combined, or a different component deployment may be used.

The memory further includes one or more programs. The one or more programs are stored in the memory. The one or more programs include a program for performing the method for selecting a virtual object interaction mode provided in the embodiments of the present disclosure.

The present disclosure provides a computer-readable storage medium. The storage medium stores at least one instruction, and at least one instruction is loaded and executed by a processor, to implement the method for selecting a virtual object interaction mode according to the foregoing method embodiments.

The present disclosure further provides a computer program product or a computer program. The computer program product or the computer program includes computer instructions, and the computer instructions are stored in a computer-readable storage medium. A processor of a computer device reads the computer instructions from the computer-readable storage medium, and the processor executes the computer instructions, to cause the computer device to perform the method for selecting a virtual object interaction mode according to any one of the foregoing method embodiments.

The sequence numbers of the foregoing embodiments of the present disclosure are merely for description purpose but do not imply the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for selecting a virtual object interaction mode, applicable to a computer device, the method comprising:
   displaying a target interaction control, the target interaction control being configured to control a target virtual object to select an interactive object in a first interaction mode in a virtual battle and interact with the interactive object;
   displaying a candidate mode option in response to an operation for displaying interaction mode for the target interaction control, the candidate mode option comprising a target mode option, and the target mode option corresponding to a second interaction mode;
   switching the first interaction mode to the second interaction mode in response to a selection operation of interaction mode for the target mode option; and
   displaying an interactive effect between the target virtual object and a target interactive object in response to an operation for displaying interactive effect for the target interaction control, the target interactive object being an interactive object determined according to the second interaction mode.

2. The method according to claim 1, wherein displaying the candidate mode option in response to the operation for displaying interaction mode for the target interaction control comprises:
   determining that the operation for displaying interaction mode is received in response to a first trigger signal for the target interaction control; and
   displaying the candidate mode option at a display location corresponding to the target interaction control.

3. The method according to claim 2, wherein displaying the candidate mode option at the display location corresponding to the target interaction control comprises:
   displaying a fan-shaped region panel on a peripheral side of the target interaction control using the target interaction control as a center, the fan-shaped region panel comprising the candidate mode option; or
   displaying a switching path using the target interaction control as a path starting point, an end point of the switching path being the candidate mode option; or
   superimposing and displaying the candidate mode option at the display location corresponding to the target interaction control.

4. The method according to claim 1, wherein after displaying the candidate mode option in response to the operation for displaying interaction mode for the target interaction control, the method further comprises:
   receiving an option browsing operation for the target mode option; and
   displaying the target mode option in a target display mode according to the option browsing operation, wherein
   the target display mode comprises increasing display brightness of the target mode option; or the target display mode comprises displaying a pattern identifier for the target mode option; or the target display mode comprises stroke displaying the target mode option.

5. The method according to claim 4, wherein the interaction mode includes an interaction mode introduction; and
   after displaying the target mode option in the target display mode according to the option browsing operation, the method further comprises:
   enlarging a display area of the target mode option; and
   displaying, in an enlarged target mode option, an interaction mode introduction corresponding to the second interaction mode.

6. The method according to claim 1, wherein the target interaction control has a target interaction identifier, the candidate mode option further comprises a history mode option corresponding to the first interaction mode, and the history mode option comprises the target interaction identifier configured to indicate that the target virtual object determines an interactive object in an interaction mode indicated by the target interaction identifier.

7. The method according to claim 6, wherein after switching the first interaction mode to the second interaction mode in response to the selection operation of interaction mode for the target mode option, the method further comprises:
   clearing the target interaction identifier in the history mode option and displaying the target interaction identifier in the target mode option.

8. The method according to claim 1, wherein displaying the interactive effect between the target virtual object and the target interactive object in response to the operation for displaying interactive effect for the target interaction control comprises:
   determining, in response to a second trigger signal for the target interaction control, that the operation for displaying interactive effect is received by the target interaction control; and
   displaying the interactive effect between the target virtual object and the target interactive object.

9. The method according to claim 1, wherein the interaction mode comprises at least one of a player-to-enemy interaction mode or a player-to-friend interaction mode, wherein the player-to-enemy interaction mode comprises a priority of the virtual object attacking opposing virtual objects of different camps in the virtual battle; and the player-to-friend interaction mode comprises a priority of the virtual object interacting with friend virtual objects of a same camp in the virtual battle.

10. The method according to claim 1, wherein the target virtual object determines a priority of each candidate interactive object in the virtual battle according to an interaction mode, the candidate interactive object is a virtual object that satisfies a condition for interacting with the target virtual object, and the interaction mode comprises at least one of a distance priority mode, a numerical value priority mode, a percentage priority mode, or a level priority mode, wherein the distance priority mode comprises determining a priority of each candidate interactive object according to a distance between the target virtual object and each candidate interactive object;

the numerical value priority mode comprises determining a priority of each candidate interactive object according to a numerical value of an attribute value of each candidate interactive object;

the percentage priority mode comprises determining a priority of each candidate interactive object according to a percentage of an attribute value of each candidate interactive object; and the level priority mode comprises determining a priority of each candidate interactive object according to a level of each candidate interactive object.

11. A computer device, comprising a processor and a memory, the memory storing at least one instruction, at least one program, a code set, or an instruction set, the at least one instruction, the at least one program, the code set, or the instruction set being loaded and executed by the processor to implement a method for selecting a virtual object interaction mode, applicable to a computer device, the method comprising:

displaying a target interaction control, the target interaction control being configured to control a target virtual object to select an interactive object in a first interaction mode in a virtual battle and interact with the interactive object;

displaying a candidate mode option in response to an operation for displaying interaction mode for the target interaction control, the candidate mode option comprising a target mode option, and the target mode option corresponding to a second interaction mode;

switching the first interaction mode to the second interaction mode in response to a selection operation of interaction mode for the target mode option; and displaying an interactive effect between the target virtual object and a target interactive object in response to an operation for displaying interactive effect for the target interaction control, the target interactive object being an interactive object determined according to the second interaction mode.

12. The device according to claim 11, wherein displaying the candidate mode option in response to the operation for displaying interaction mode for the target interaction control comprises:

determining that the operation for displaying interaction mode is received in response to a first trigger signal for the target interaction control; and displaying the candidate mode option at a display location corresponding to the target interaction control.

13. The device according to claim 12, wherein displaying the candidate mode option at the display location corresponding to the target interaction control comprises:

displaying a fan-shaped region panel on a peripheral side of the target interaction control using the target interaction control as a center, the fan-shaped region panel comprising the candidate mode option; or displaying a switching path using the target interaction control as a path starting point, an end point of the switching path being the candidate mode option; or superimposing and displaying the candidate mode option at the display location corresponding to the target interaction control.

14. The device according to claim 11, wherein after displaying the candidate mode option in response to the operation for displaying interaction mode for the target interaction control, the method further comprises:

receiving an option browsing operation for the target mode option; and displaying the target mode option in a target display mode according to the option browsing operation, wherein the target display mode comprises increasing display brightness of the target mode option; or the target display mode comprises displaying a pattern identifier for the target mode option; or the target display mode comprises stroke displaying the target mode option.

15. The device according to claim 14, wherein the interaction mode includes an interaction mode introduction; and after displaying the target mode option in the target display mode according to the option browsing operation, the method further comprises:

enlarging a display area of the target mode option; and displaying, in an enlarged target mode option, an interaction mode introduction corresponding to the second interaction mode.

16. The device according to claim 11, wherein the target interaction control has a target interaction identifier, the candidate mode option further comprises a history mode option corresponding to the first interaction mode, and the history mode option comprises the target interaction identifier configured to indicate that the target virtual object determines an interactive object in an interaction mode indicated by the target interaction identifier.

17. The device according to claim 16, wherein after switching the first interaction mode to the second interaction mode in response to the selection operation of interaction mode for the target mode option, the method further comprises:

clearing the target interaction identifier in the history mode option and displaying the target interaction identifier in the target mode option.

18. The device according to claim 12, wherein displaying the interactive effect between the target virtual object and the target interactive object in response to the operation for displaying interactive effect for the target interaction control comprises:

determining, in response to a second trigger signal for the target interaction control, that the operation for displaying interactive effect is received by the target interaction control; and displaying the interactive effect between the target virtual object and the target interactive object.

19. The device according to claim 12, wherein the interaction mode comprises at least one of a player-to-enemy interaction mode or a player-to-friend interaction mode, wherein
- the player-to-enemy interaction mode comprises a priority of the virtual object attacking opposing virtual objects of different camps in the virtual battle; and
- the player-to-friend interaction mode comprises a priority of the virtual object interacting with friend virtual objects of a same camp in the virtual battle.

20. A non-transitory computer-readable storage medium, storing at least one instruction, at least one program, a code set, or an instruction set, the at least one instruction, the at least one program, the code set, or the instruction set being loaded and executed by a processor to implement a method for selecting a virtual object interaction mode, applicable to a computer device, the method comprising:
- displaying a target interaction control, the target interaction control being configured to control a target virtual object to select an interactive object in a first interaction mode in a virtual battle and interact with the interactive object;
- displaying a candidate mode option in response to an operation for displaying interaction mode for the target interaction control, the candidate mode option comprising a target mode option, and the target mode option corresponding to a second interaction mode;
- switching the first interaction mode to the second interaction mode in response to a selection operation of interaction mode for the target mode option; and
- displaying an interactive effect between the target virtual object and a target interactive object in response to an operation for displaying interactive effect for the target interaction control, the target interactive object being an interactive object determined according to the second interaction mode.

* * * * *